US009727547B2

(12) United States Patent
Migos et al.

(10) Patent No.: US 9,727,547 B2
(45) Date of Patent: Aug. 8, 2017

(54) MEDIA INTERFACE TOOLS AND ANIMATIONS

(71) Applicant: Apple Inc., Cupertino, CA (US)

(72) Inventors: Charles J. Migos, San Francisco, CA (US); Allison Styer, Cupertino, CA (US); M. Frank Emanuel, Cupertino, CA (US); Jacob Refstrup, Vancouver, WA (US); Christopher Pethick, Vancouver, WA (US); Guillermo Ortiz, Vancouver, WA (US)

(73) Assignee: Apple Inc., Cupertino, CA (US)

( * ) Notice: Subject to any disclaimer, the term of this patent is extended or adjusted under 35 U.S.C. 154(b) by 534 days.

(21) Appl. No.: 13/951,299

(22) Filed: Jul. 25, 2013

(65) Prior Publication Data

US 2014/0365859 A1 Dec. 11, 2014

Related U.S. Application Data

(60) Provisional application No. 61/832,745, filed on Jun. 7, 2013.

(51) Int. Cl.
*G06F 17/24* (2006.01)
*G06F 15/02* (2006.01)
*G06F 9/00* (2006.01)
*G09B 5/06* (2006.01)

(52) U.S. Cl.
CPC ........ *G06F 17/241* (2013.01); *G06F 15/0291* (2013.01); *G09B 5/06* (2013.01)

(58) Field of Classification Search
CPC ........ G06F 17/00; G06F 3/041; G06F 15/177; G01C 21/34

USPC .................. 715/230; 701/200, 201
See application file for complete search history.

(56) References Cited

U.S. PATENT DOCUMENTS

| 5,886,694 | A | * | 3/1999 | Breinberg | ................ | G09G 5/14 |
| | | | | | | 715/788 |
| 7,458,014 | B1 | * | 11/2008 | Rubin et al. | ................... | 715/229 |
| 8,443,277 | B2 | * | 5/2013 | Goldman et al. | .............. | 715/206 |
| 2003/0182052 | A1 | * | 9/2003 | DeLorme et al. | ............ | 701/201 |

(Continued)

OTHER PUBLICATIONS

Adobe, "Creating Your First LiveCycle Designer", published Sep. 24, 2010, http://help.adobe.com/en_US/livecycle/9.0/createfirstapp.pdf.*

(Continued)

*Primary Examiner* — Cesar Paula
*Assistant Examiner* — Jian Huang
(74) *Attorney, Agent, or Firm* — Blank Rome LLP

(57) ABSTRACT

Disclosed herein are systems, methods, and non-transitory computer-readable storage media for displaying display primary e-book content, note glyphs and margins in an e-book interface according to the size of the e-book interface; animating "peeking pages" and glyph size during and after re-sizing events; selecting text in an e-book, entering a note that will become linked to the selected text, and representing the presence of the note on top of the primary content of the e-book as an interactive glyph according to some embodiments of the present technology; and displaying note objects, editing note objects, and navigating between note objects in a note-view pane of an e-book interface according to some embodiments of the present technology.

21 Claims, 32 Drawing Sheets

(56) References Cited

U.S. PATENT DOCUMENTS

| | | | |
|---|---|---|---|
| 2006/0075353 A1* | 4/2006 | DeSpain | G06F 17/24 |
| | | | 715/770 |
| 2010/0318893 A1* | 12/2010 | Matthews et al. | 715/230 |
| 2011/0163971 A1* | 7/2011 | Wagner | G06F 3/04817 |
| | | | 345/173 |
| 2011/0296295 A1 | 12/2011 | Hodges et al. | |
| 2011/0314424 A1* | 12/2011 | Gusmorino | G06F 3/04817 |
| | | | 715/846 |
| 2012/0113019 A1 | 5/2012 | Anderson | |
| 2013/0002532 A1 | 1/2013 | Raffle et al. | |
| 2013/0021281 A1 | 1/2013 | Tse et al. | |
| 2013/0082985 A1 | 4/2013 | Sasakura | |
| 2013/0326392 A1* | 12/2013 | Maltesson | 715/780 |

OTHER PUBLICATIONS

Adobe Acrobat Pro XI with correlated multi-pane window resizing, released Oct. 15, 2012, Acrobat screenshots.pdf.*
Screen shots of Adobe Acrobat Pro XI with correlated multi-pane window resizing, related Oct. 15, 2012 (Acrobat screenshots.pdf).*

* cited by examiner

Chapter 1 ~ Spring

John Adams, was the first to live in the newly built White House, though only for four winter months.

Adams was first president in White House. Ol' George didn't get to live there. This book is awesome.

1227

1226₁  26

Nov 16, 2012, 3:40 PM

He then lined the grounds with groves of trees and even started growing plants inside the White House itself, arranging pots of geraniums and strawberries and fig and orange trees along three sunny window bays in his office.
Jefferson had a green thumb! 1226₃  26

Nov 16, 2012, 3:40 PM

"...the failure of one thing repaired by the success of another; and instead of one harvest, a continued one throughout the year."
Good Jefferson quote 1226ₙ  26

Nov 16, 2012, 3:40 PM

American Grown
Chapter 1 - Spring

1210

I first had the idea to plant a vegetable garden at the White House in my kitchen back in chicago. It was early in the presidential primary season-the Iowa caucuses hadn't even happened yet. In recent years,I had been thinking a great deal about how the food my family are affected our health. And as i was putting dinner on the table that night, I thought to myself that if something amazing happened, if my husband- then very much the underdog in the race-actually won,then as first lady I might want to focus on this issue more broadly. That night, it occured to me that planting a garden at the White House-a garden where children could learn about growing and preparing freash, nutritious food-could be one small way to got started. As the primary season, wore on,I kept the idea of that garden in the back of my mind. Soon after my husband was elected, I began in think about how to make it a reality.

A Brief History of Gardens at the White House  1222

Our second president John Adams, was the first to live in the newly built White House thought only for four winter months. He had the ground plowed and fertilized for its first "Kitchen garden" (such gardens supplied fresh produce in the Kitchen and were often located near the Kitchen door), though no one knows exactly where it was located. He lost his bid for reelection and departed the White House in March 1801; his garden was never harvested.

*Bo by the Jefferson beds.*

SPRING   A Season of Hope and New Beginnings   26

What do we mean by "understanding" something? We can imagine that this complicated array of moving things which constitutes "the world" is something like a great chess game being played by the gods, and we are observers of the game. We do not know what the rules of the game are; all we are allowed to do is to watch the playing. Of course, if we watch long enough, we may eventually catch on to a few of the rules. The rules of the game are what we mean by fundamental physics. Even if we knew every rule, however, we might not be able to understand why a particular move is made in the game, merely because it is too complicated and our minds are limited. If you play chess you must know that it is easy to learn all the rules, and yet it is often very hard to select the best move or to understand why a player moves as he does. So it is in nature, only much more so; but we may be able at least to find all the rules. Actually, we do not have all the rules now. Every once in a while somthing like castling is going on that we still do not understand. Aside from not knowing all of the rules, what we really can explain in terms of those rules is very limited, because almost all situations are so enormodsly complicated that we cannot follow the plays of the game using the rules, much less tell what is going to happen next. We must, therefore limit ourselves to the more basic question of the rules of the game. It we know the rules, we consider that we "understand" the world.

How can we tell whether the rules which we "guess" at are really right if we cannot analyze the game very well? There are, roughly speaking, three ways. First, there may be situations where nature has arranged, or we arrange nature, to be simple and to have so few parts that we can predict exactly what will happen, and thus we can check how our rules work. (In one corner of the board there may be only a few chess pieces at work, and that we can figure out exactly.)

A second good way to check rules is in terms of less specific rules derived from them. For example, the rule on the move of a bisho on a chessboard is that it moves only on the diagonal. One can deduce, no matter how many moves may be made, that a certain bishop will always be on a red square. So, without being able to follow the details, we can always check our idea about the bishop's motion by finding out whethere it is always on a red square. Of course it will be, for a long time, until all of a sudden we find that it is on a black square (what happened of course, is that in the meantime it was captured, another pawn crossed for queening, and it turned into a bishop on a black square). That is the way it is in physics. For a long time we will have a rule that works excellently in an over-all way, even when we cannot follow the details, and then some time we may discover a new rule. From the point of view of basic physics, the most interesting phenomena are of course in the new places, the places where the rules do not work - not the places where they do work! That is the way in which we discover new rules.

The third way to tell whether our ideas are right is relatively crude but probably the most powerful of them all. That is, by rough approximation. While we may not be "Incidentally, the third way to tell if the ideas are right is a very crude way, but probably the most powerful of them all-and that is by tough approximation."

FIG. 30

[Book Title]

What do we mean by "understanding" something? We can imagine that this complicated array of moving things which constitutes "the world" is something like a great chess game being played by the gods, and we are observers of the game. We do not know what the rules of the game are; all we are allowed to do is to watch the playing. Of course, if we watch long enough, we may eventually catch on to a few of the rules. The rules of the game are what we mean by fundamental physics. Even if we knew every rule, however, we might not be able to understand why a particular move is made in the game, merely because it is too complicated and our minds are limited. If you play chess you must know that it is easy to learn all the rules, and yet it is often very hard to select the best move or to understand why a player moves as he does. So it is in nature, only much more so; but we may be able at least to find all the rules. Actually, we do not understand all the rules now. Every once in a while something like castling is going on that we still do not understand. Aside from not knowing all of the rules, what we really can explain in terms of those rules is very limited, because almost all situations are so enormodsly complicated that we cannot follow the plays of the game using the rules, much less tell what is going to happen next. We must, therefore, limit ourselves to the more basic question of the rules of the game. If we know the rules, we consider that we "understand" the world.

How can we tell whether the rules which we "guess" at are really right if we cannot analyze the game very well? There are, roughly speaking, three ways. First, there may be situations where nature has arranged, or we arrange nature, to be simple and to have so few parts that we can predict exactly what will happen, and thus we can check how our rules work. (In one corner of the board there may be only a few chess pieces at work, and that we can figure out exactly.)

A second good way to check rules is in terms of less specific rules derived from them. For example, the rule on the move of a bishop on a chessboard is that it moves only on the diagonal. One can deduce, no matter how many moves may be made, that a certain bishop will always be on a red square. So, without being able to follow the details, we can always check our idea about the bishop's motion by finding out whethere it is always on a red square. Of course it will be, for a long time, until all of a sudden we find that it is on a black square (what happened of course, is that in the meantime it was captured, another pawn crossed for queening, and it turned into a bishop on a black square). That is the way it is in physics. For a long time we will have a rule that works excellently in an over-all way, even when we cannot follow the details, and then some time we may discover a new rule. From the point of view of basic physics, the most interesting phenomena are of course in the new places, the places where the rules do not work - not the places where they do work! That is the way in which we discover new rules.

The third way to tell whether our ideas are right is relatively crude but probably the most powerful of them all. That is, by rough approximation. While we may not be "Incidentally, the third way to tell if the ideas are right is a very crude way, but probably the most powerful of them all-and that is by tough approximation."

MEDIA INTERFACE TOOLS AND ANIMATIONS

CROSS-REFERENCE TO RELATED APPLICATIONS

This application claims priority to U.S. Application No. 61/832,745, entitled "MEDIA INTERFACE TOOLS AND ANIMATIONS", filed Jun. 7, 2013, of which the full disclosure of this application is incorporated herein by reference for all purposes.

BACKGROUND

1. Technical Field

The present disclosure relates to displaying media and more specifically to tools for providing users with intuitive controls for navigating and annotating media.

2. Introduction

Many types of display devices can be used to display text and other media. For example, text from electronic books can be stored on and read from a digital device such as an electronic book reader, personal digital assistant (PDA), mobile phone, a laptop computer or the like. The device can have buttons for scrolling through the pages of the electronic book as the user reads. However, existing devices and applications configured for displaying text and other media lack robust navigation and annotation tools. Likewise, known systems do not provider users with an intuitive look and feel.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Some embodiments of the present technology involve an e-book application configured to display primary e-book content, notes, note glyphs representing notes and margins in an e-book interface according to the size of the e-book interface. The e-book application can also animate "peeking pages" and glyph size during and after re-sizing events.

Some embodiments involve displaying an e-book interface, receiving an interface re-sizing event, and determining whether the event is an enlarging event or a shrinking event. If the re-sizing event is a shrinking event, an e-book application can shrink the glyphs back to their smallest size in the presentation pane and when the re-sizing event is an enlarging event, the e-book application determines whether the e-book interface is now large enough to display a two-page format.

Some embodiments involve measuring the size of the margin panes and determining whether the margins can fit full-sized notes with text having a predetermined size. When the margins are large enough, the e-book application can display the full-sized notes in the presentation pane. When the margin panes cannot accommodate full-sized notes, the e-book application can scale the glyphs using a predetermined scaling factor correlated to the size of the margins in a smooth animation.

Some embodiments of the present technology involve selecting text in an e-book, entering a note that will become linked to the selected text, and representing the presence of the note on top of the primary content view of the e-book as an interactive glyph according to some embodiments of the present technology.

Some embodiments involve displaying note objects, editing note objects, and navigating between note objects in a note-view pane of an e-book interface according to some embodiments of the present technology.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 4-10 illustrate exemplary interfaces for selecting text in an e-book, entering a note that will become linked to the selected text, and representing the presence of the note on top of the primary content of the e-book as an interactive glyph according to some embodiments of the present technology;

FIGS. 12-22 illustrate exemplary interfaces for displaying note objects, editing note objects, and navigating between note objects in a note-view pane of an e-book interface according to some embodiments of the present technology;

FIGS. 24-27 illustrate exemplary interfaces for displaying primary e-book content, note glyphs and margins and for animating peeking pages and glyphs during and after re-sizing events according to some embodiments of the present technology;

FIGS. 29-30 illustrate exemplary interfaces for displaying primary e-book content in a two-page format, note glyphs and margins and for animating glyphs during and after re-sizing events according to some embodiments of the present technology.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Disclosed herein are systems, methods and non-transitory computer-readable media which present media presentations in a media interface that can be re-sized and that can deliver a variety of navigation tools, note-taking tools, resizing options, etc. Additionally, the media interface can employ animations that can make a user's experience with the interface more intuitive and more enjoyable.

As used herein, media presentations shall refer to a wide variety of digital publications or exhibitions. For example, a media presentation can include text books, multimedia books, word processing documents, slideshow presentations, spreadsheet presentations, webpages, audio playback interfaces, video playback interfaces, multimedia playback interfaces, data visualization interfaces, augmented reality interfaces, etc. Although these specific examples are listed explicitly, those with ordinary skill in the art having the benefit of this disclosure will readily appreciate that any type of digital media presentation, now known or later developed, can benefit from the present technology.

For the purpose of providing a consistent theme, the remaining portion of the disclosure shall focus on a specific type of media presentation: a multimedia electronic book (hereinafter referred to as an "e-book"), such as a "Multi-Touch" book available from Apple, Inc., located in Cupertino, Calif.

An e-book can be accessed by an electronic device through an application stored on an electronic device or through a browser-based application. An e-book application can be configured for navigating e-books, purchasing e-books, subscribing to periodical e-books, providing users with access to their e-book libraries, sorting e-books (e.g. by author, genre, etc.), building user-customized collections of e-books, sharing e-books between multiple devices, browsing the table of contents of e-books, etc.

Figure 1:
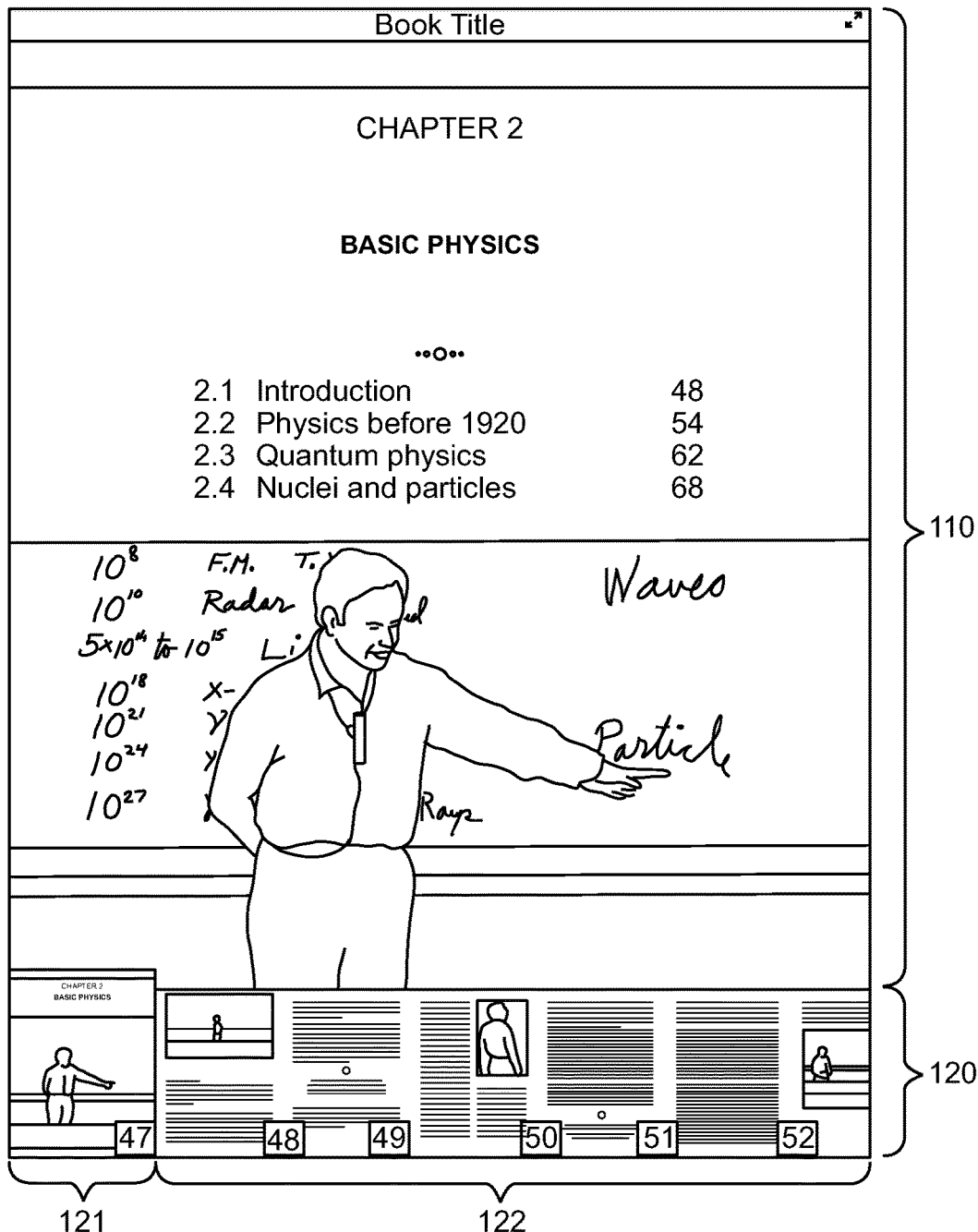
FIGS. 1-3 illustrate exemplary chapter-based e-book viewing and navigation interfaces according to some embodiments of the present technology.
Figure 2:
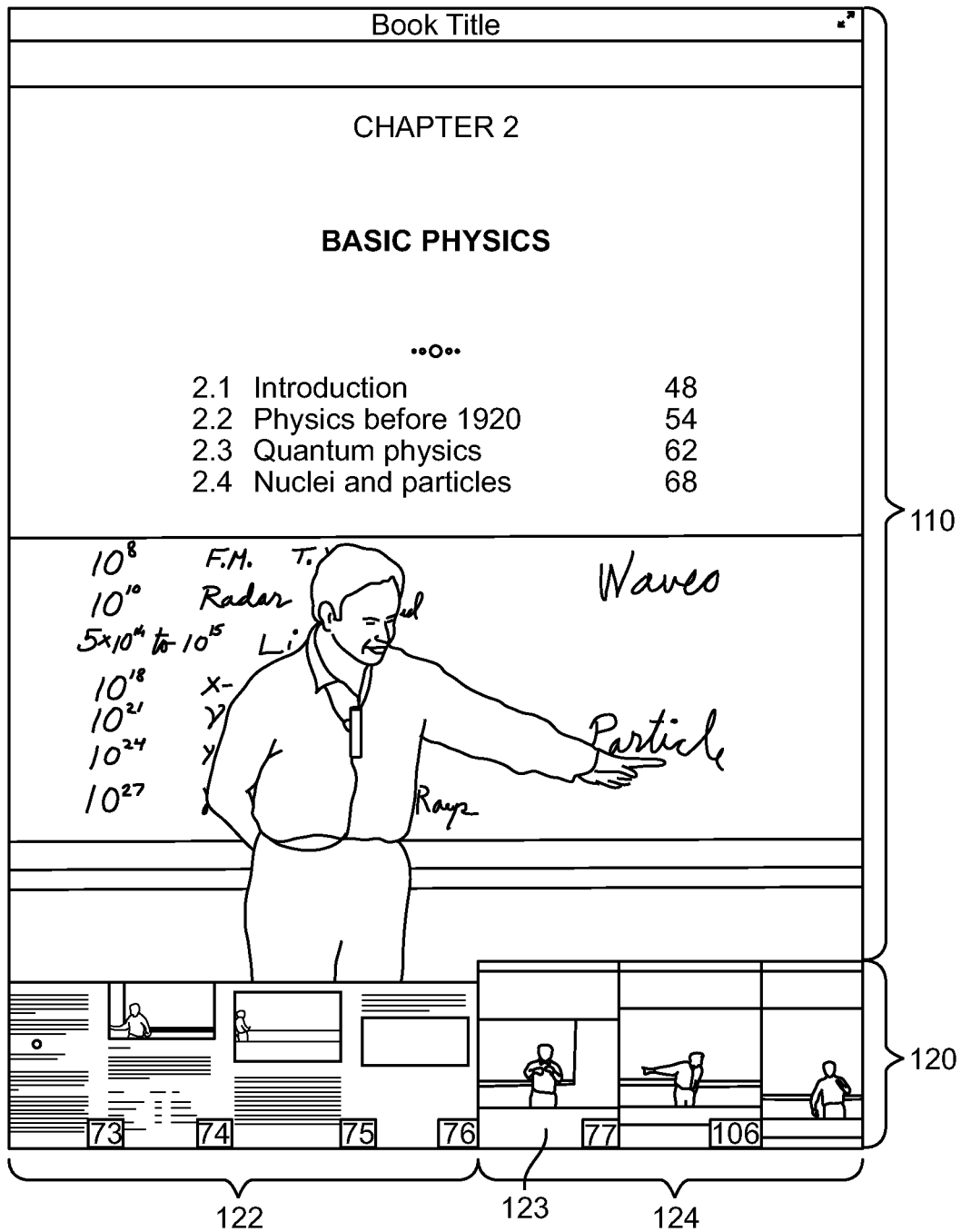
Figure 3:
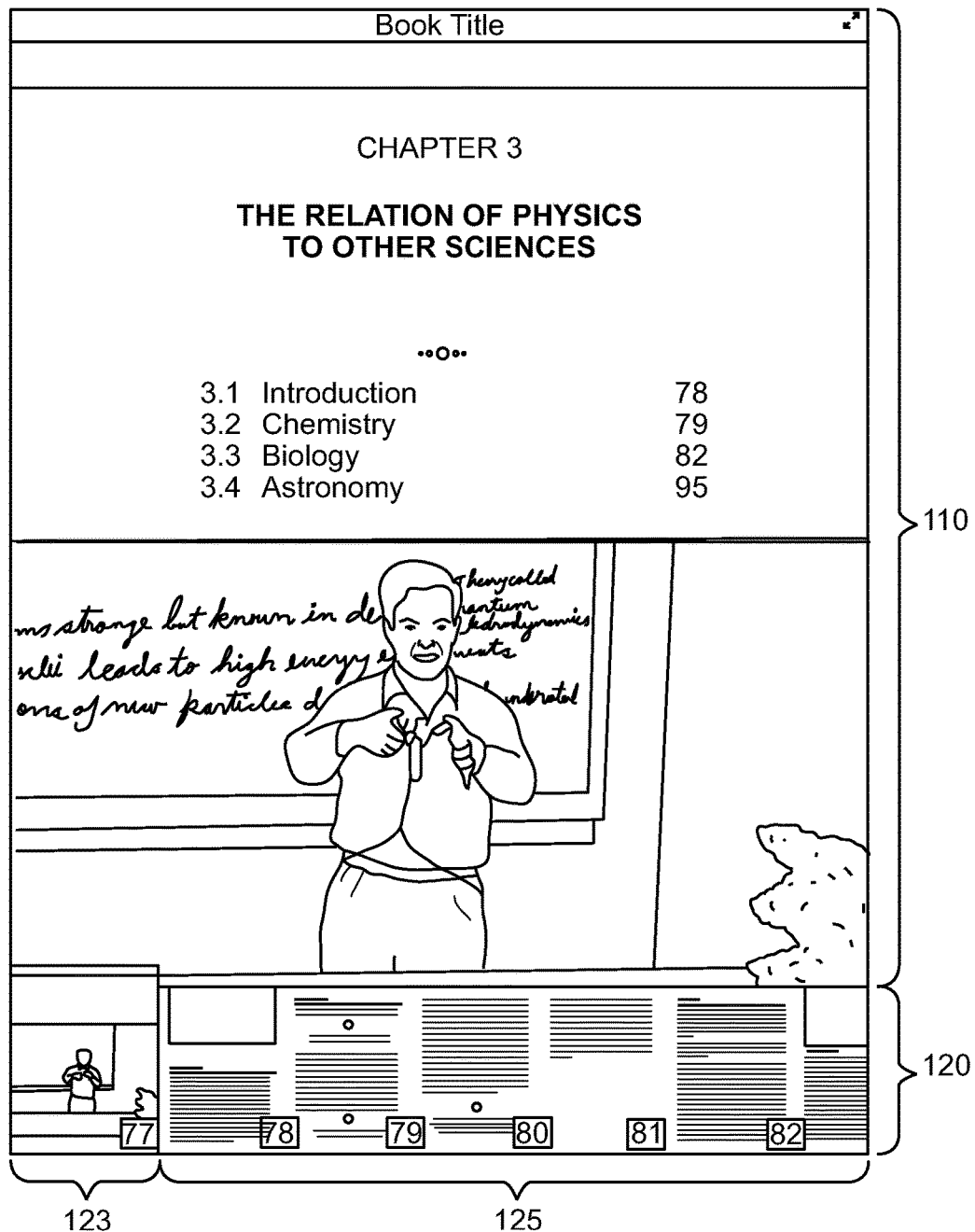

FIGS. 1-3 illustrate chapter-based e-book viewing and navigation interfaces according to some embodiments of the present technology.

As illustrated in FIG. 1, an e-book interface comprises a presentation pane 110 containing primary content of the e-book. As shown in FIG. 1, the primary content includes a chapter splash page displaying chapter contents and book artwork. The e-book interface also includes a navigation pane 120 that displays a representation 121 of the chapter splash page, representations of all the other chapter splash pages (not shown), as well as representations 122 of the pages contained with that particular chapter. As shown in FIG. 2, the navigation pane 120 shows representations 122 of the pages contained in the chapter for which content is currently being displayed in the presentation pane 110 and representations of other chapter splash pages 124, but not representations of all the pages in the e-book. Accordingly, upon a reader selecting a representation 123 of another chapter splash page, a new set of representations 125 of pages contained in the newly-selected chapter appear, as shown in FIG. 3.

The chapter view navigation tools illustrated in FIGS. 1-3 provide readers with an intuitive and user-friendly way of navigating an e-book. In some embodiments, a page currently being presented in the presentation pane 110 is displayed in standout from the rest of the pages in the navigation pane 120. In some embodiments, the representations of the pages in the chapters are displayed serially edge-to-edge while in some embodiments, the chapter content pages are collapsed into a partial stack view. In some embodiments, the chapter content pages are displayed serially unless a threshold number of pages exist in a chapter and the e-book application displays the pages in a partial stack.

Some embodiments of the present technology involve tools for allowing readers of e-books to select portions of text in an e-book and tie notes to those portions. FIGS. 4-10 illustrate interfaces for selecting text in an e-book, entering a note that will become linked to the selected text, and representing the presence of the note on top of the primary content of the e-book as an interactive glyph according to some embodiments of the present technology.

Figure 4:
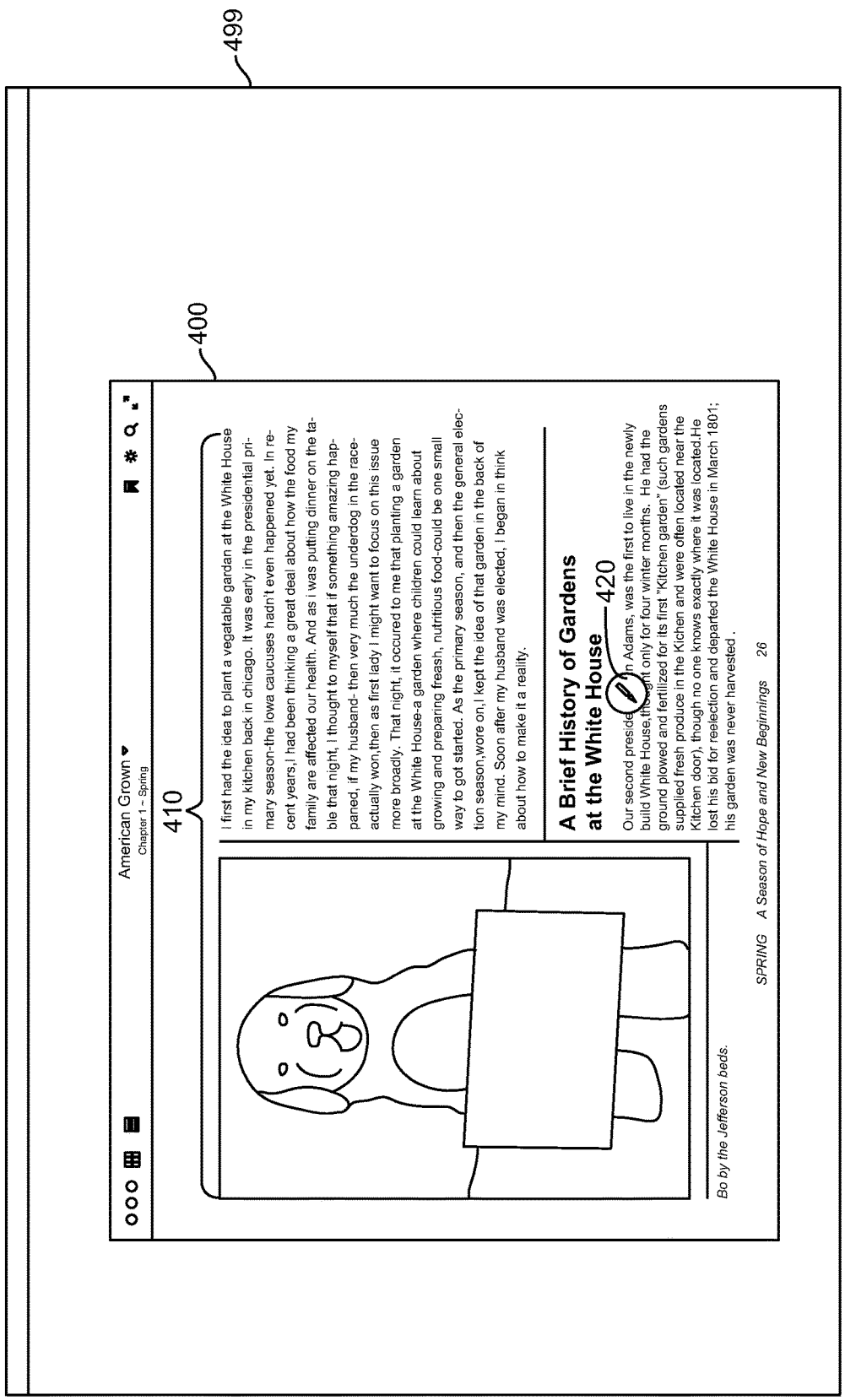
Figure 5:
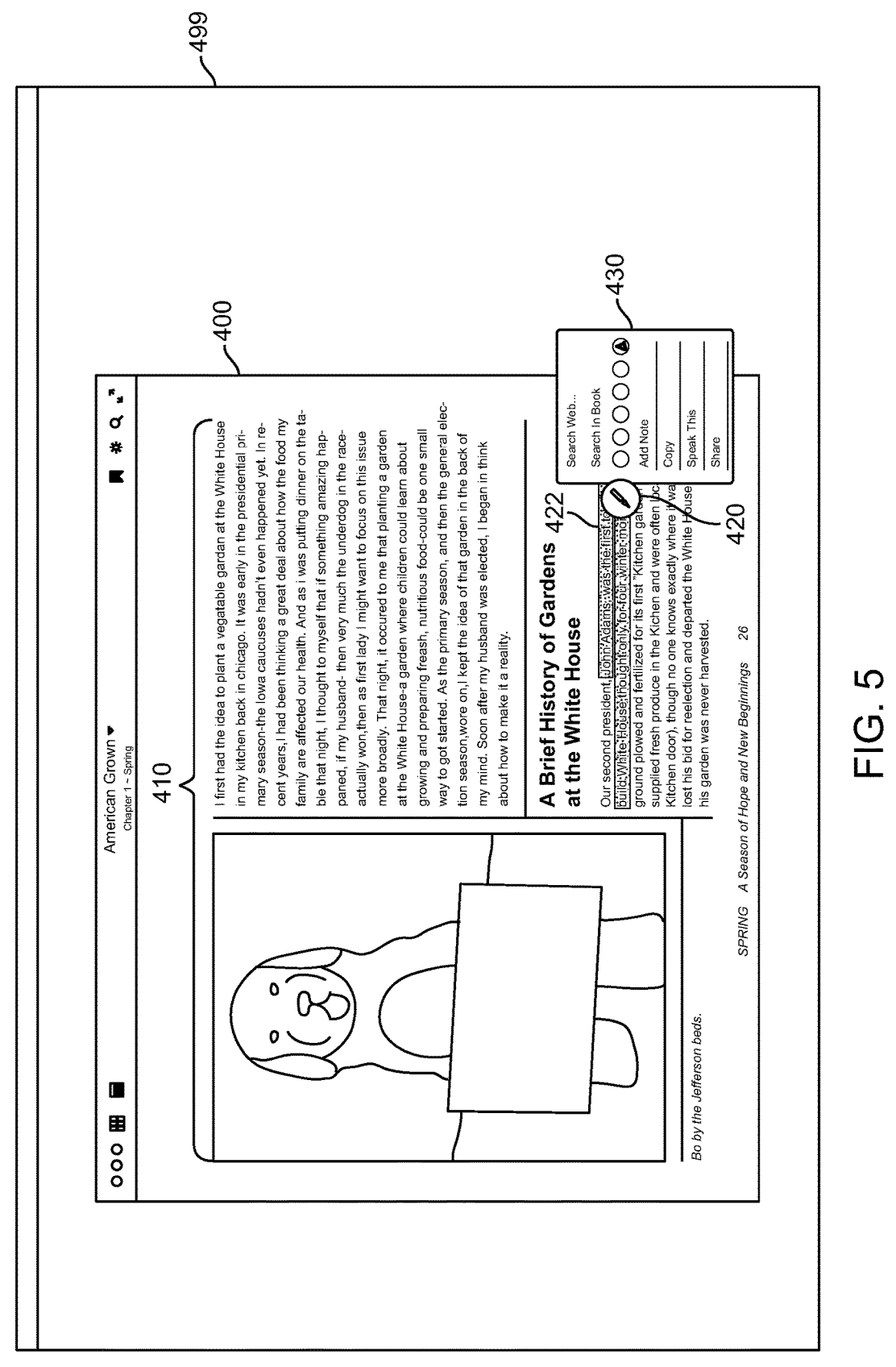
Figure 6:
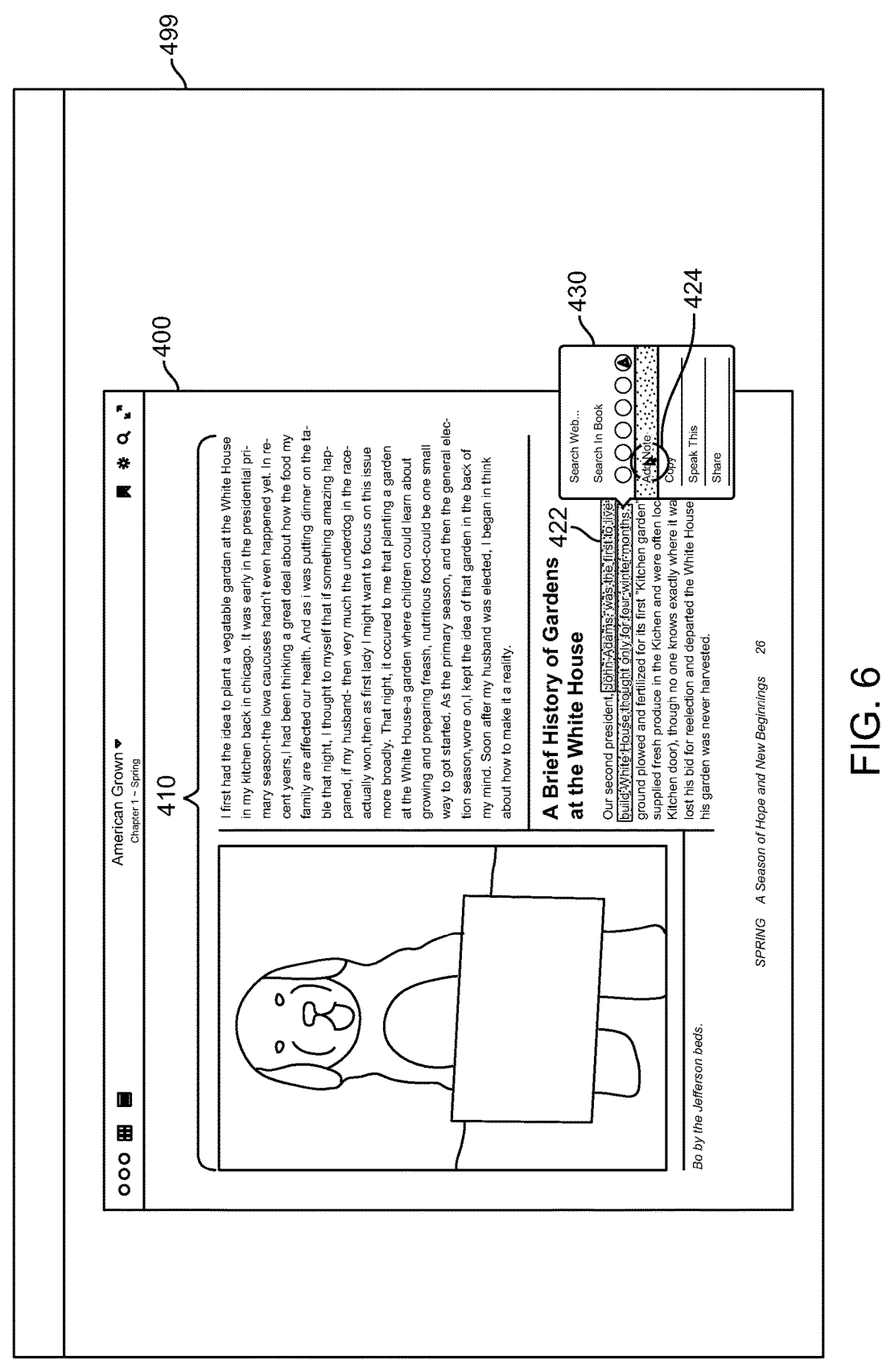
Figure 7:
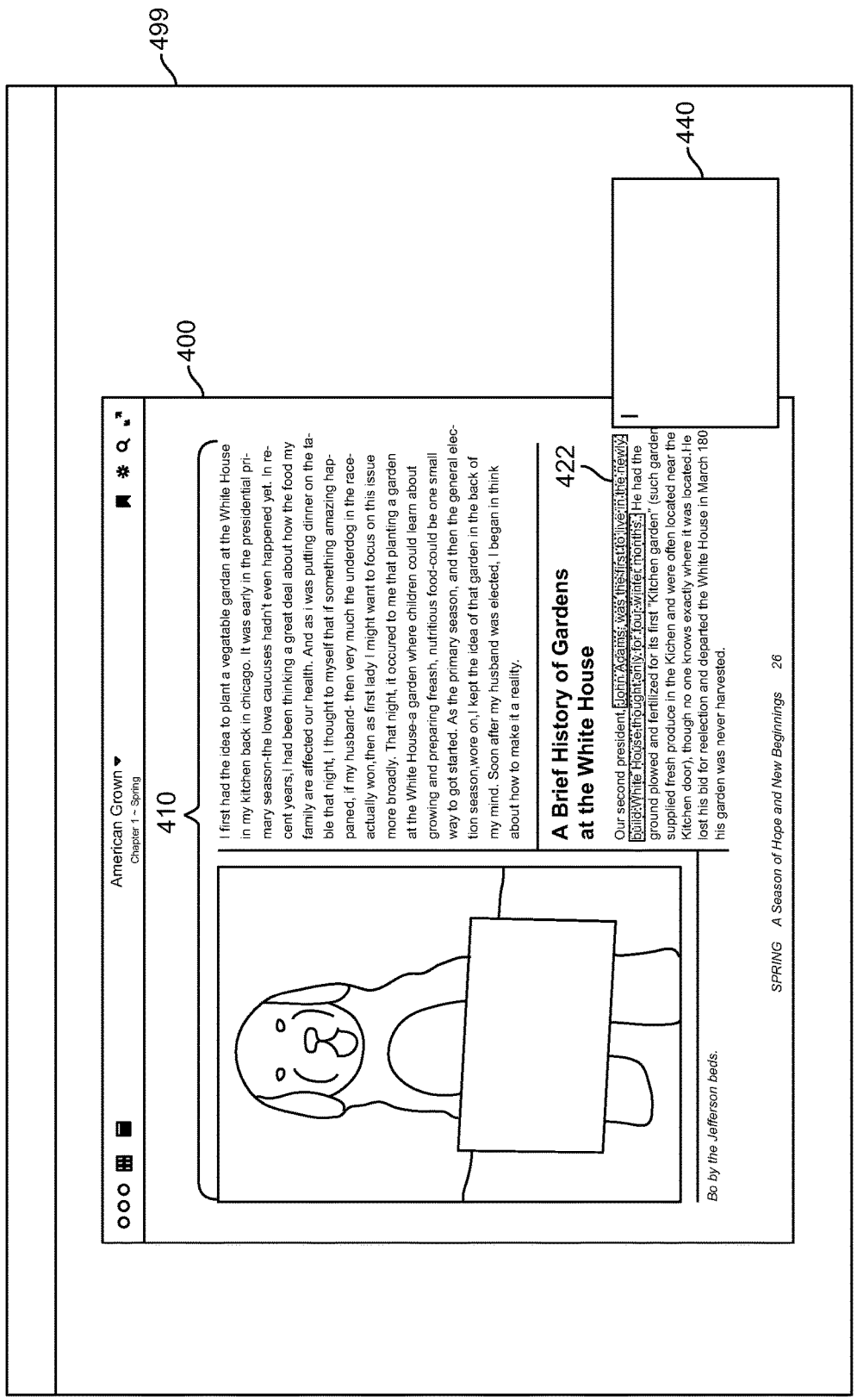

FIG. 4 illustrates an e-book 400 displayed on computer display 499. The e-book 400 includes primary content displayed in a presentation pane 410. The e-book 400 also displays a text-select tool 420 in response to a reader clicking a cursor icon over a section of text. FIG. 5 illustrates the e-book 400 after the reader held down the text-select tool 420 and dragged over a portion of text 422, resulting in the portion of text becoming highlighted. Additionally, upon termination of the dragging motion, the e-book application displays a tool box 430 for presenting the reader with tool functions. The tool box 430 can allow a reader to search the internet for information relating to the selected portion of text 422, search the remainder of the e-book for content related to the selected portion of text 422, change the color of the highlighting, copy the selected portion of text 422 to a clipboard, instruct the e-book application or a related application to convert the selected portion of text 422 to machine speech, share the selected portion of text 422 (via email, instant messaging, text messaging, social media, etc.), as well as annotate the selected portion of text 422. As shown in FIG. 6, a reader can select to annotate the selected portion of text 422 using a selection cursor 424. Upon selecting the annotation function in the tool box 430, a notation entry window 440 appears next to the selected portion of text 422 and a blinking text cursor appears in the notation entry window 440, as shown in FIG. 7. In some embodiments of the present technology, the notation entry window 440 can appear on either the right side of the presentation pane 410 for text selection actions that terminate to the right of where they began or on the left side of the presentation pane 410 for text selection actions that terminate to the left of where they began.

In some embodiments of the present technology, the notation entry window 440 is a fixed size while a reader edits the text contained therein. For example, the notation entry window 440 can be three hundred pixels by two hundred pixels. The notation entry window 440 can appear outside of the border of the e-book interface, as illustrated in FIG. 7. In some embodiments, the e-book interface can include the presentation pane as well as margin panes (explained in more detail below) and the notation window 440 can appear in a margin pane, or partially in a margin pane and partially outside the border of the e-book interface.

Figure 8:
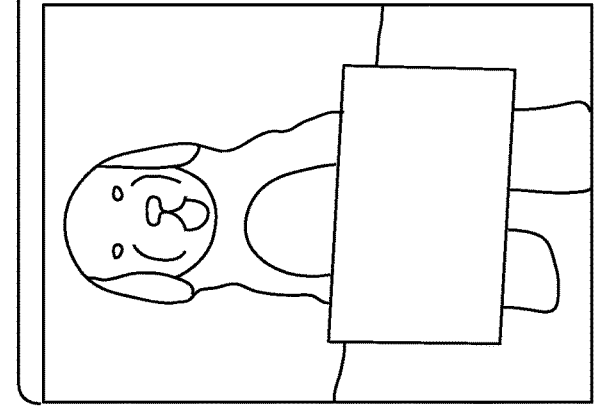
Figure 9:
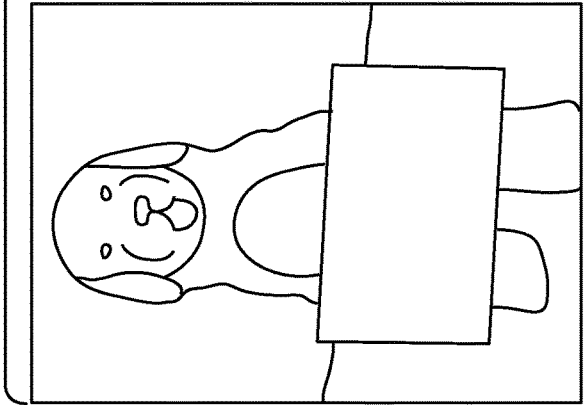
Figure 10:
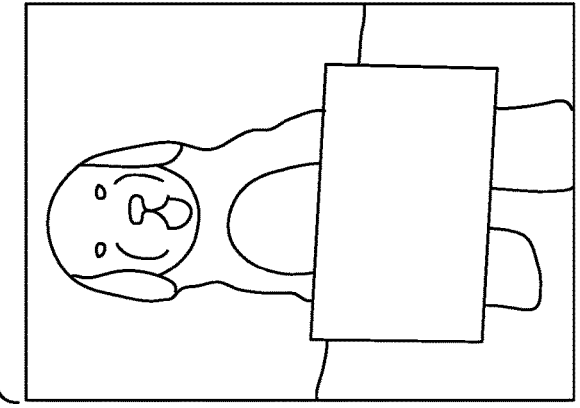

A reader can enter text notes into the notation entry window 440 as shown in FIG. 8. Also, a reader can click out of the notation window by using the selection cursor 424 to click outside of the notation window, as shown in FIG. 9. Upon clicking out of the notation entry window 440, the selected portion of text 422 remains highlighted and a glyph 450 appears as an overlay on top of the content in presentation pane, next to the selected portion of text 422, as illustrated in FIG. 10. In some embodiments, a full-sized notation is displayed in a margin pane when a margin pane is large enough (as explained below with respect to resizing the e-book interface). In some embodiments of the present technology, the glyph 450 can appear on either the right side of the presentation pane 410 for text selection actions that terminate to the right of where they began or on the left side of the presentation pane 410 for text selection actions that terminate to the left of where they began.

Figure 11:
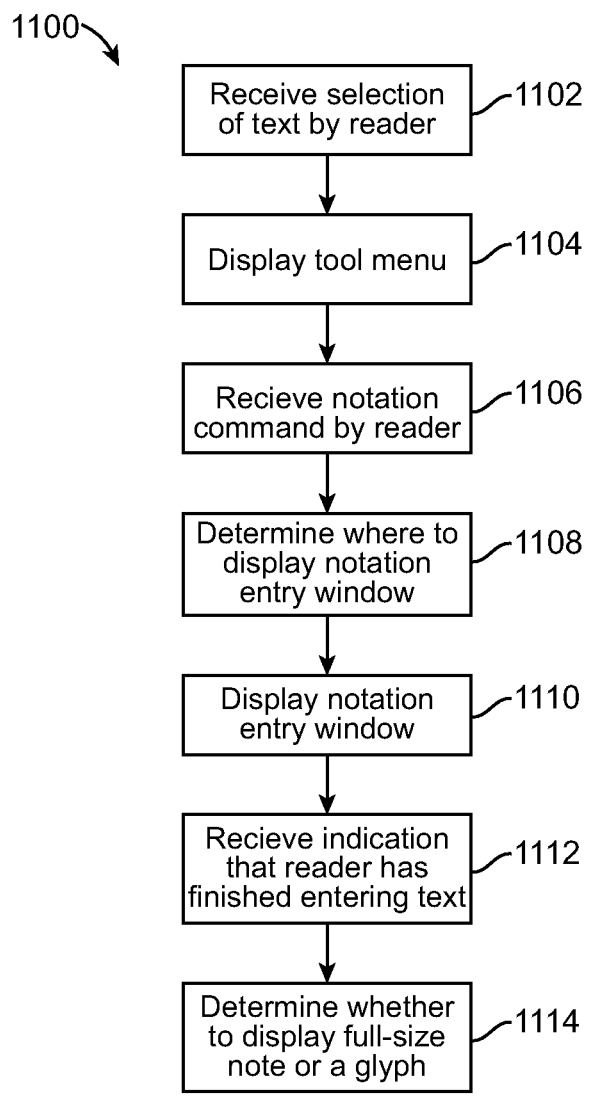
FIG. 11 illustrates an exemplary method 1100 of receiving user notation inputs in an e-book application and the e-book application displaying notes and glyphs in an e-book interface according to some embodiments of the present technology.

FIG. 11 illustrates a method 1100 of receiving user notation inputs in an e-book application and the e-book application displaying notes and glyphs in an e-book interface according to some embodiments of the present technology. The method 1100 involves receiving a selection of text by a reader 1102 and presenting the reader with a tool menu 1104. Next, the e-book application receives a notation command from the reader 1106 via the tool menu.

The e-book reader next decides where to display a notation entry window 1108. As explained above, the notation entry window can have a predetermined size. If the e-book interface does not have a large enough margin pane or no margin pane at all, the e-book application can display the notation entry window completely or partially outside the e-book interface so as not to obfuscate the text. Alternatively, if the e-book interface has a margin pane large enough to include the notation entry window, the e-book application can display the notation entry window in the margin pane of the e-book interface.

The method 1100 continues with the e-book application displaying the notation entry window with a text entry cursor 1110. Next, the e-book application receives an indication (e.g. through the reader pressing the ENTER key, or clicking outside the notation entry window) that the user has finished entering text in a notation entry window 1112. Finally, the e-book application determines whether to display a full-size note in a margin pane or to display a glyph in the presentation pane based on the size of the panes 1114. Determining where to place object based on the size of the margin panes is described in more detail below as the concept relates to resizing the e-book interface.

In some embodiments of the present technology, the e-book interface can also include a note-view pane for listing note objects for all of the notes made by a reader in an e-book. FIGS. 12-22 illustrate interfaces for displaying note objects, editing note objects, and navigating between note objects in a note-view pane of an e-book interface according to some embodiments of the present technology.

Figure 12:
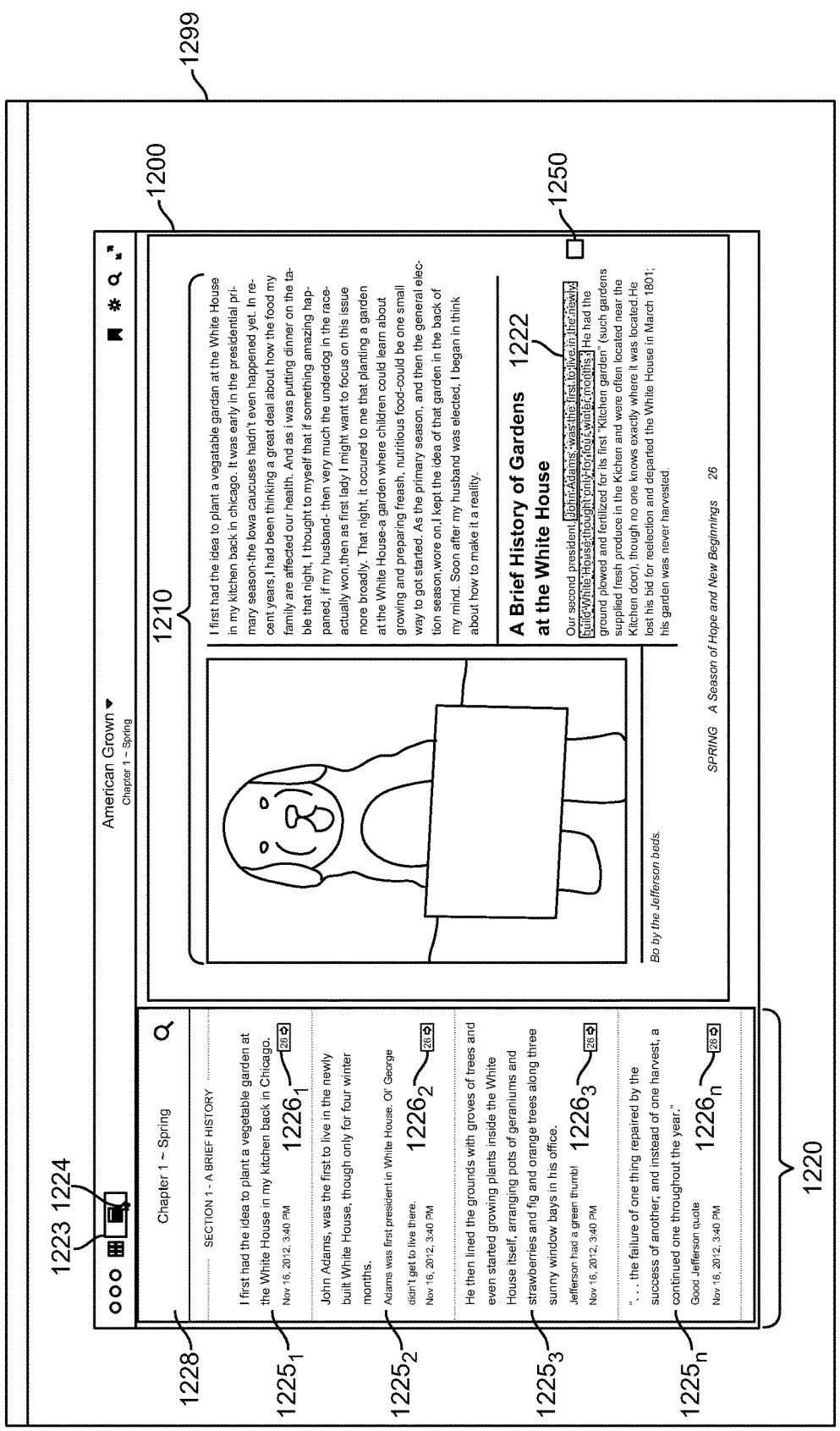

FIG. 12 illustrates an e-book 1200 displayed by an e-book application on a computer display 1299. The e-book includes a presentation pane 1210 and a note-view menu item 1223 that, when selected by a selection cursor 1224, opens a note-view pane 1220.

The note-view pane 1220 includes note objects $1225_1$, $1225_2$, $1225_3$, . . . , $1225_n$ contained in a chapter heading 1228. Note objects $1225_1$, $1225_2$, $1225_3$, . . . , $1225_n$ are made up of text highlighted in the e-book and a reader-supplied note associated therewith. The note objects $1225_1$, $1225_2$, $1225_3$, . . . , $1225_n$ also display boxes $1226_1$, $1226_2$, $1226_3$, . . . , $1226_n$ indicating the page number of the e-book pages containing the notes.

As shown in FIG. 12, note object $1225_2$ shows highlighted text 1222 and the text contained in a reader-supplied note that is represented by the glyph 1250.

Figure 13:
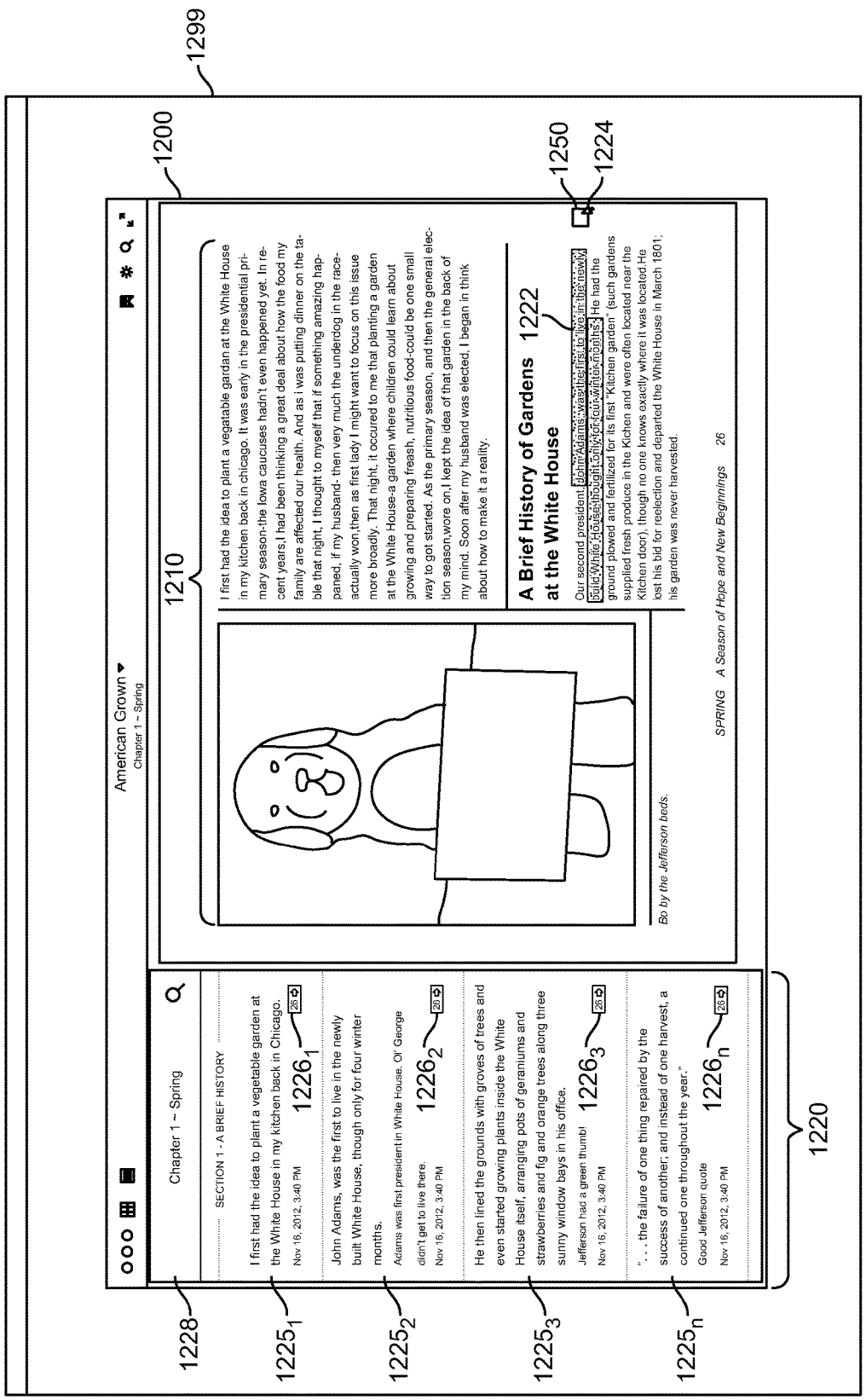
Figure 14:
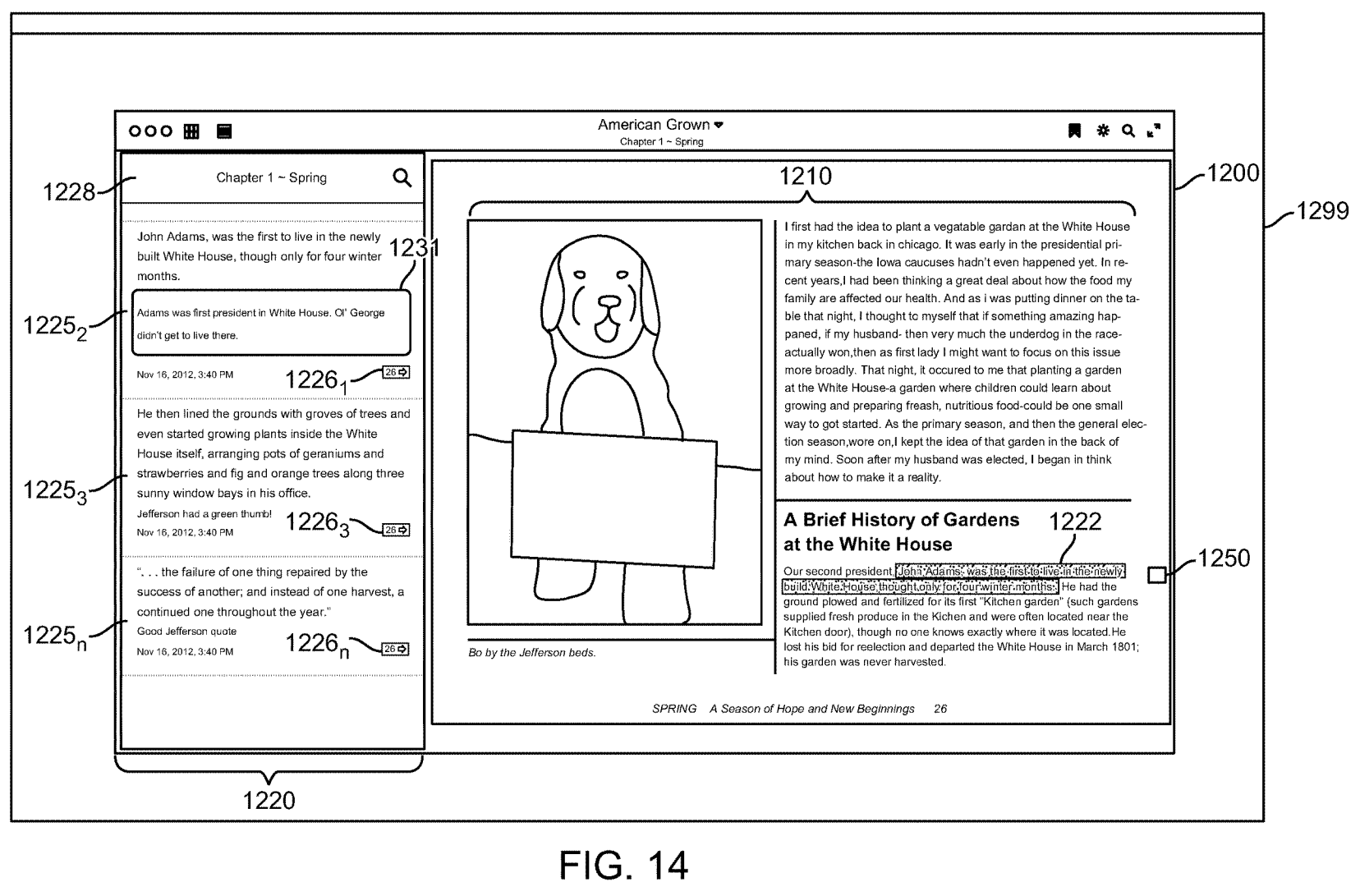
Figure 15:
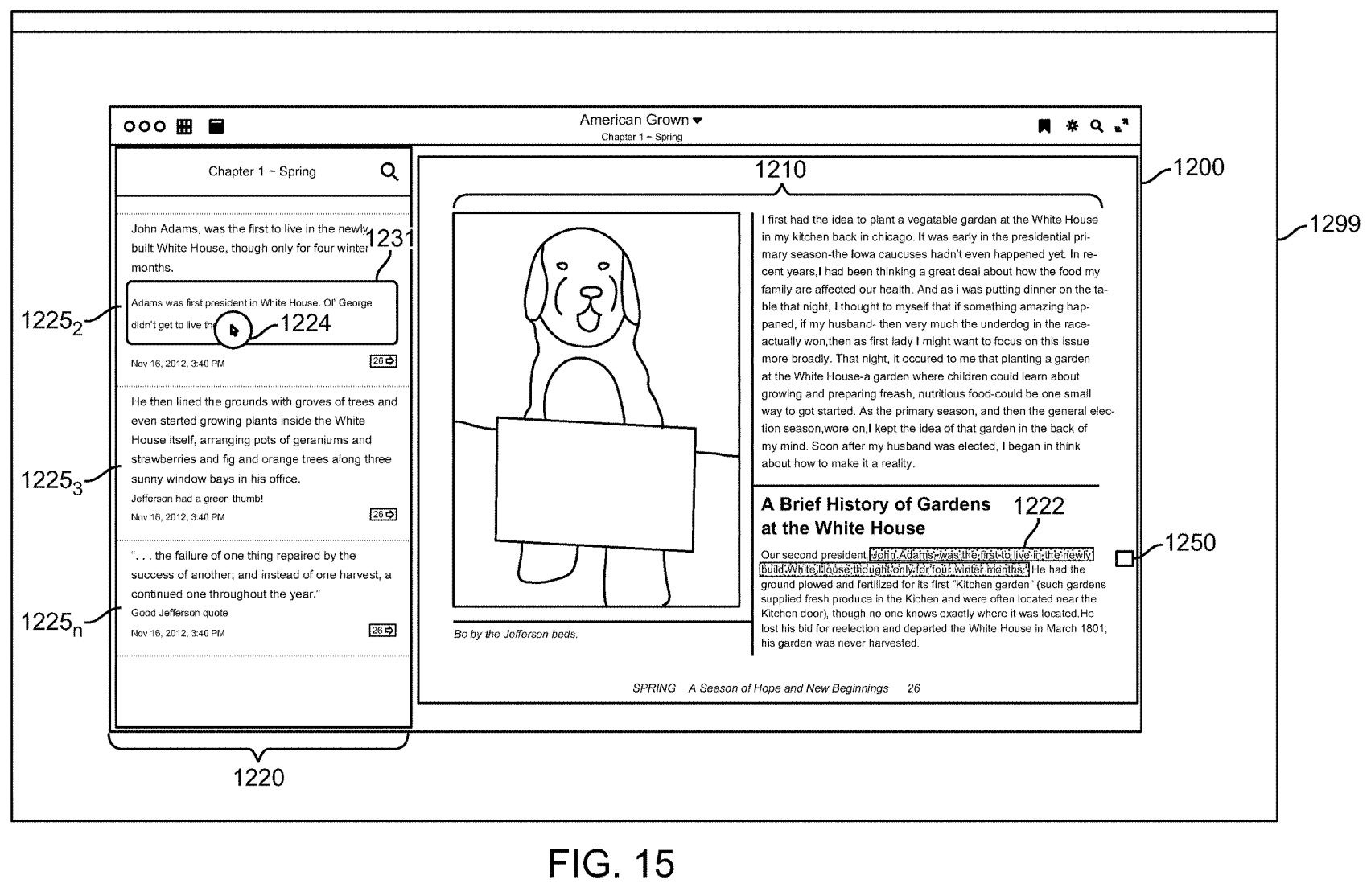
Figure 16:
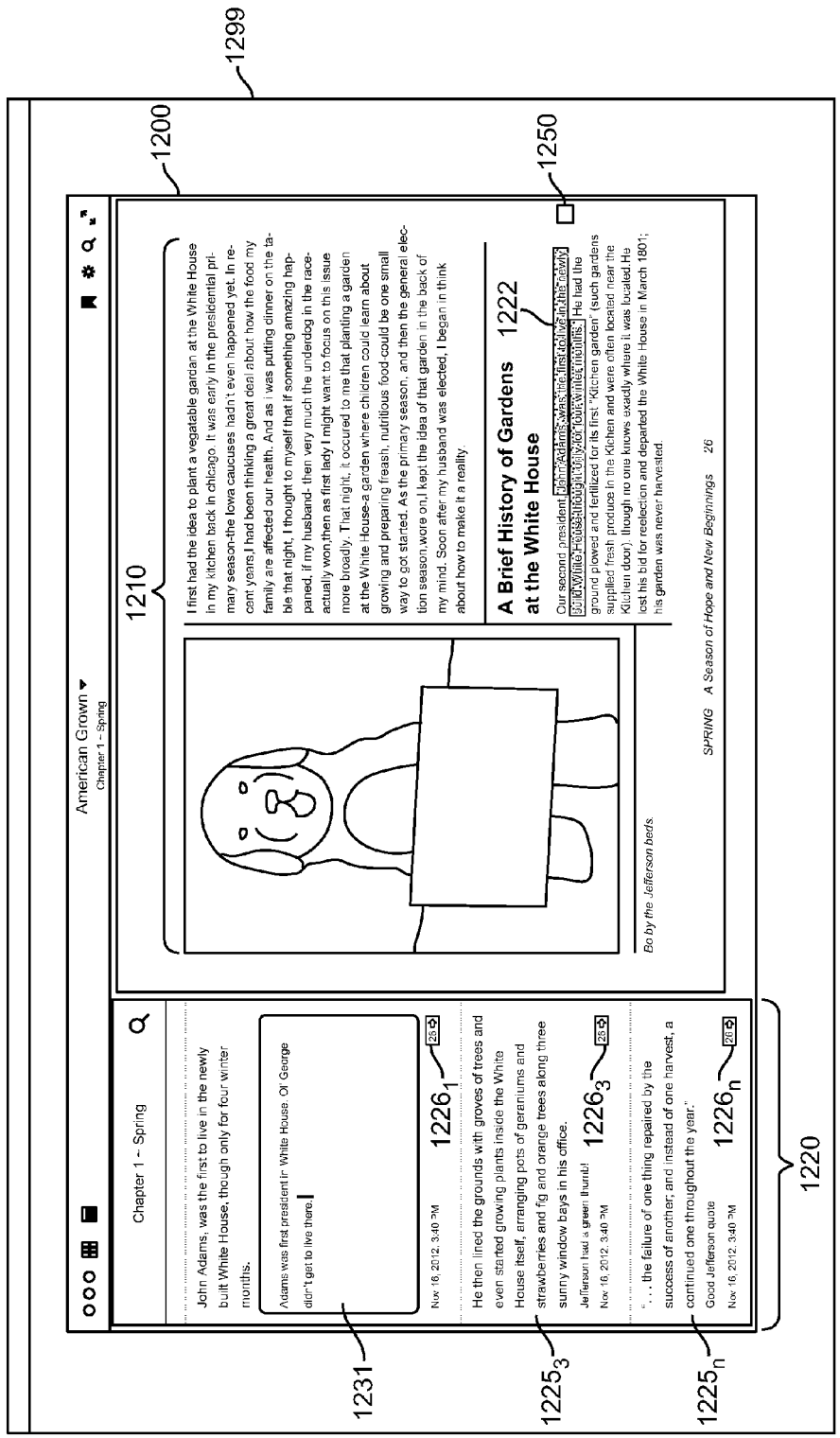

FIG. 13 illustrates the selection cursor 1224 clicking on the glyph 1250. Selection of the glyph causes the e-book application to focus the note-view pane 1220 onto a note portion 1231 of the note object $1225_2$ corresponding to the highlighted text 1222 and the text contained in a reader-supplied note that is represented by the glyph 1250, as shown in FIG. 14. Similarly, using the selection cursor 1224 to select an area in the note portion 1231 of the note object $1225_2$ causes the note portion to become editable, as shown in FIGS. 15 and 16. Also, as shown in FIG. 17, an edit 1227 made to the note portion 1231 of the note object $1225_2$ is automatically reflected in the text contained in a reader-supplied note that is represented by the glyph 1250.

Figure 18:
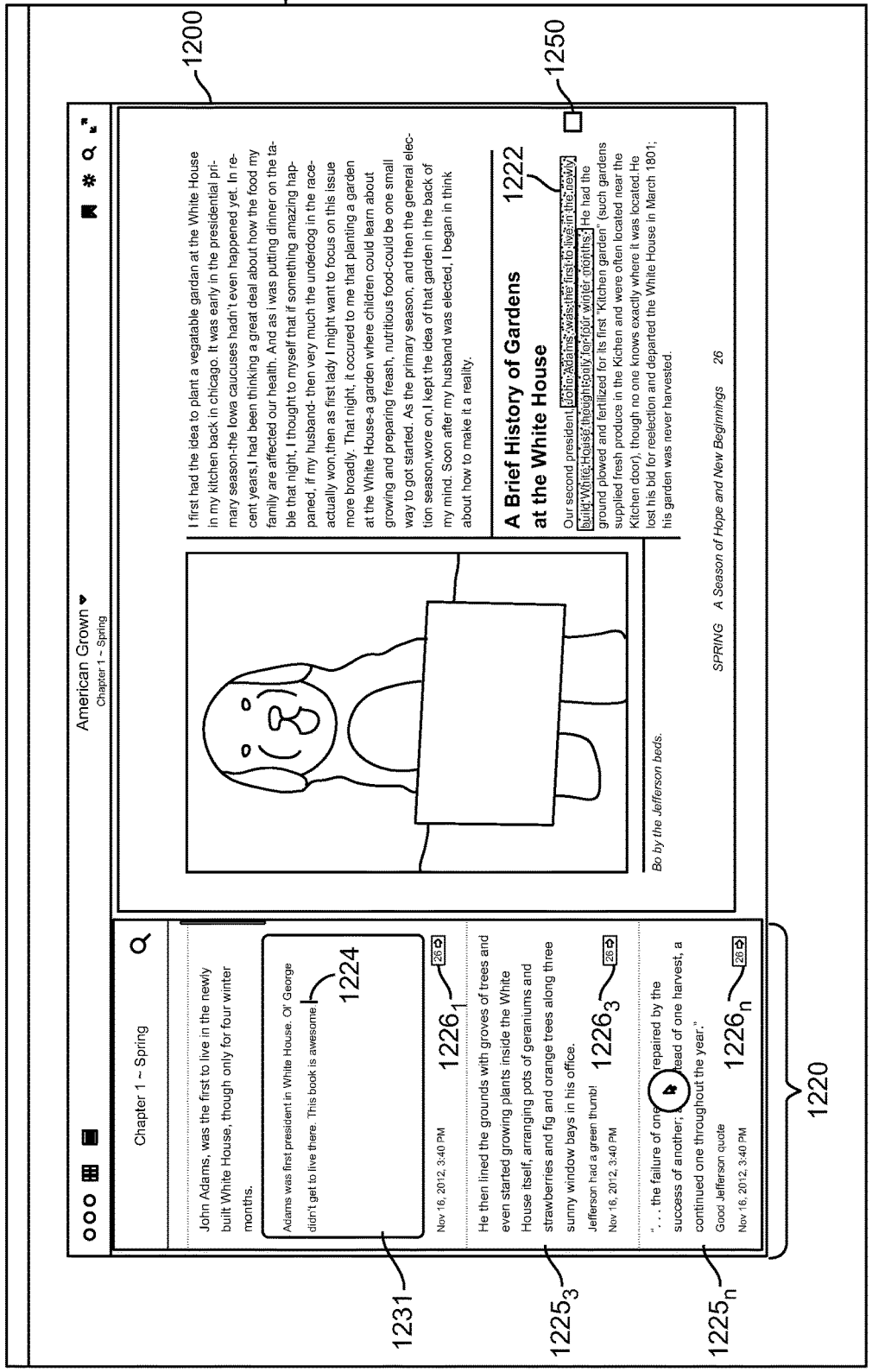
Figure 19:
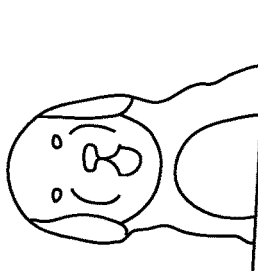
Figure 20:
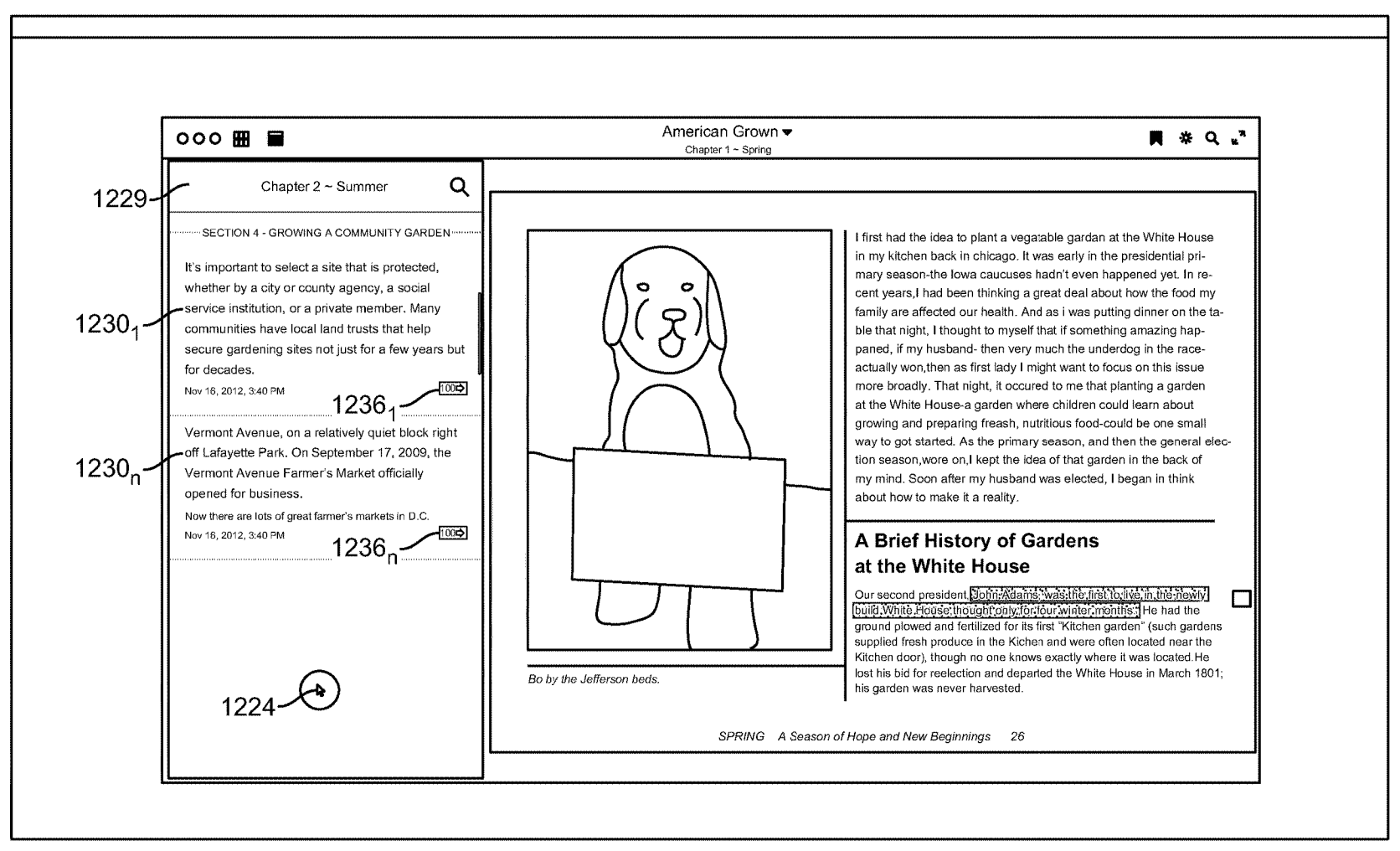
Figure 21:
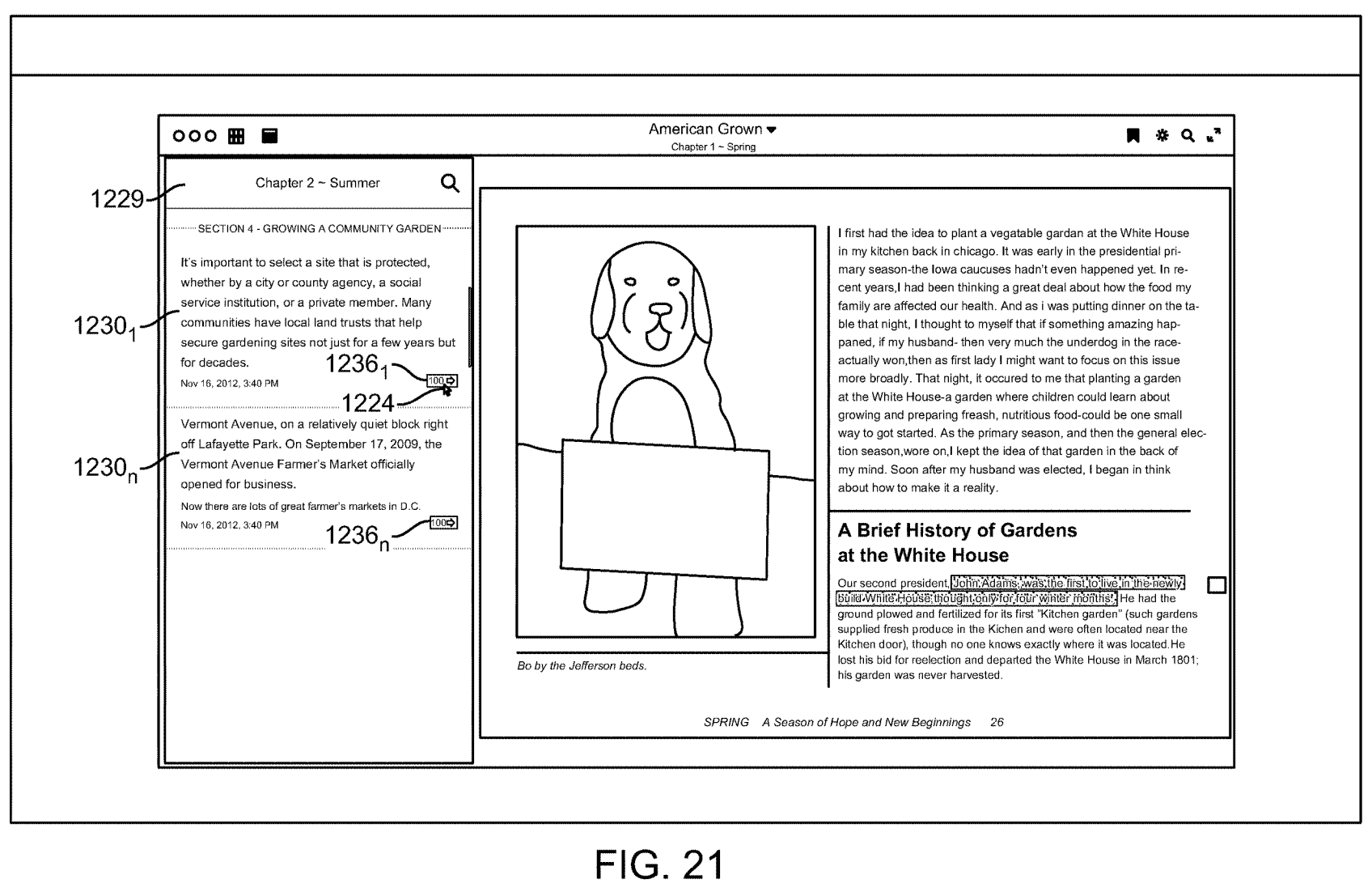
Figure 22:
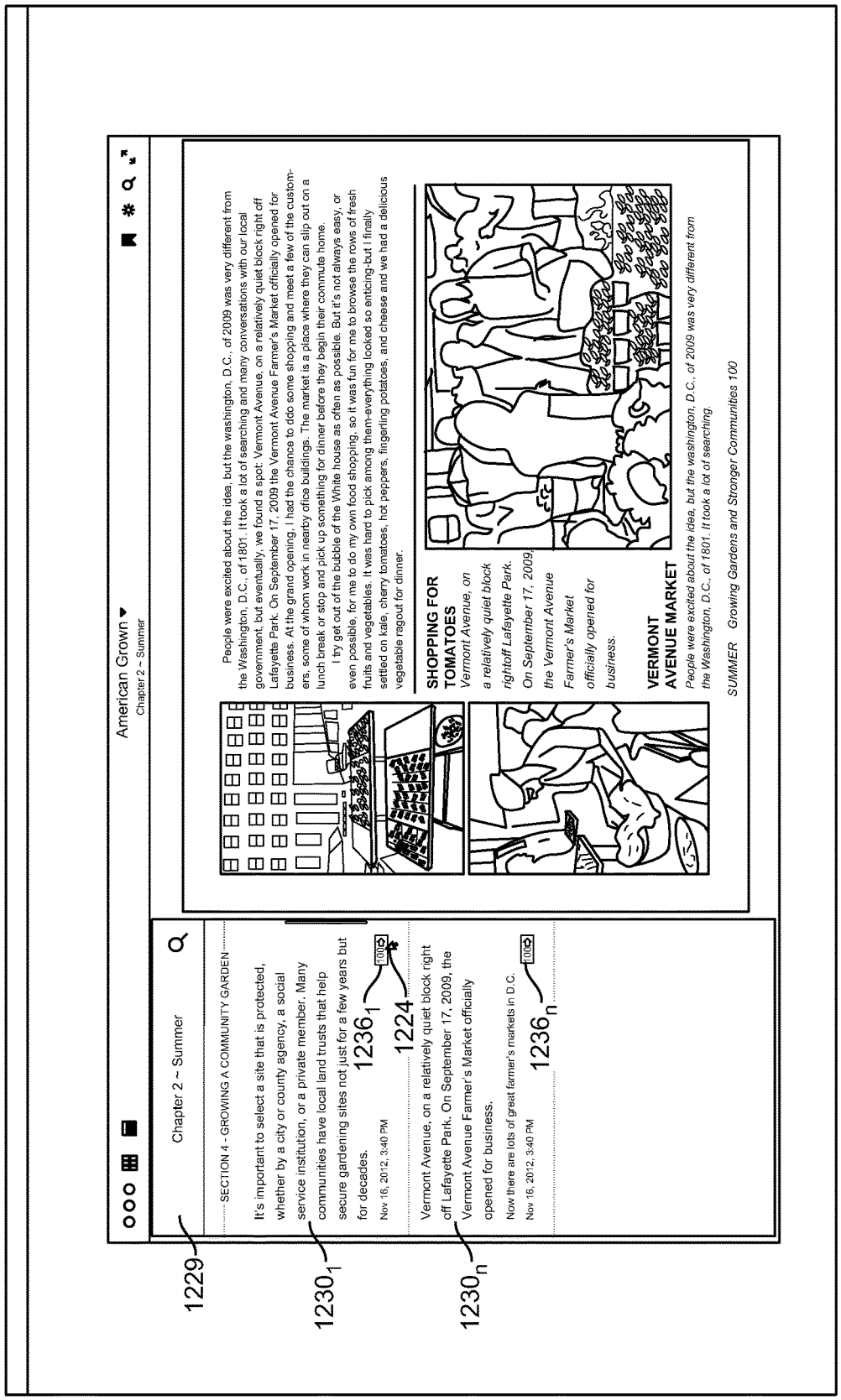

FIGS. 18 and 19 illustrate using the selection cursor 1224 to select a portion of the e-book other than the note portion 1231 of the note object $1225_2$ and toggling away from the note portion being editable. Additionally, using the selection cursor 1224 to click on another chapter heading 1229 causes the note objects $1225_1$, $1225_2$, $1225_3$, . . . , $1225_n$ to collapse under the chapter heading 1228 and causes a new set of note objects $1230_1$, . . . , $1230_n$ to grow from chapter heading 1229, as shown in FIG. 20. The note objects $1230_1$, . . . , $1230_n$ under the chapter heading 1229 also include display boxes $1236_1$, . . . $1236_n$ indicating the page number of the e-book pages containing the notes. Using the selection cursor 1224 to click on a display box 12361 causes the e-book application to jump to the page of the e-book specified in the display box 12361 in the presentation pane 1210, as shown in FIGS. 21 and 22.

Figure 23:
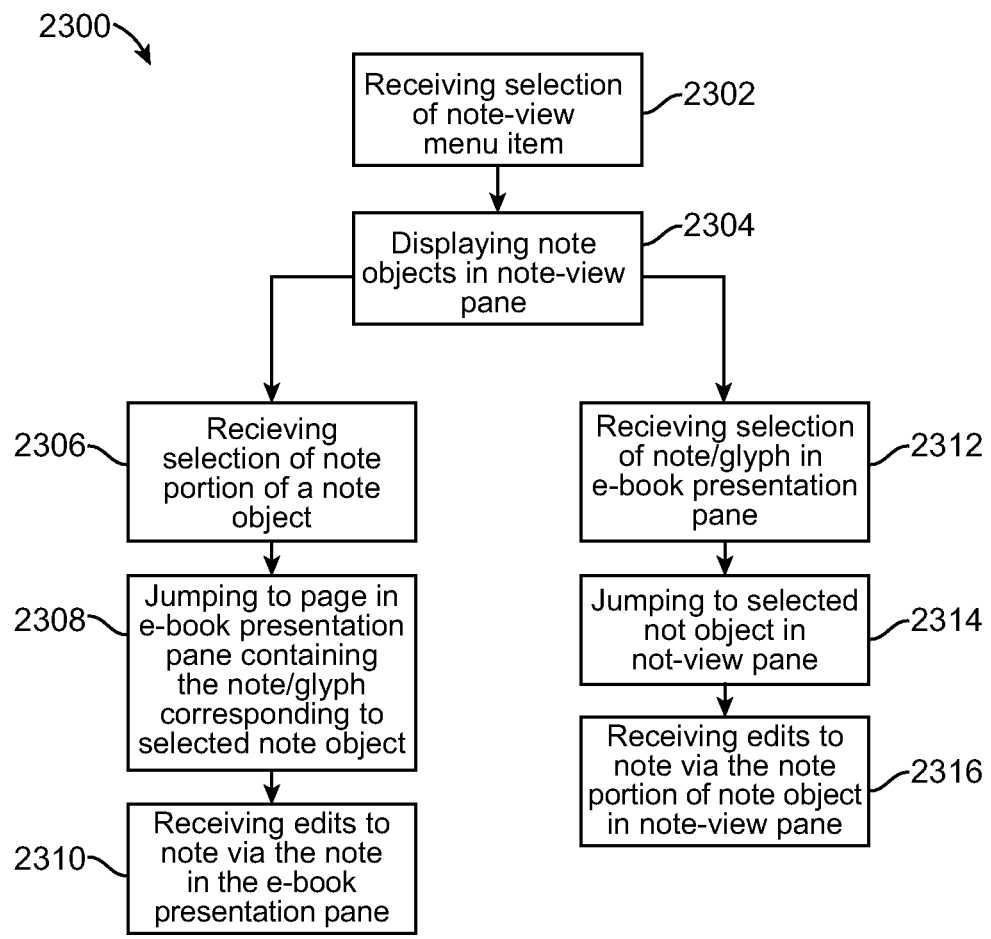
FIG. 23 illustrates an exemplary method 2300 of displaying note objects, editing note objects, and navigating between note objects in a note-view pane of an e-book interface according to some embodiments of the present technology.

FIG. 23 illustrates a method 2300 of displaying note objects, editing note objects, and navigating between note objects in a note-view pane of an e-book interface according to some embodiments of the present technology. The method involves an e-book application receiving a reader's selection of a note-view menu item 2302 and displaying note objects in a note-view pane 2304.

The method 2300 can involve receiving a reader's selection of a note portion of a note object in the note-view pane 2306, jumping to a page in the e-book presentation pane containing the note/glyph corresponding to the selected note object 2308, and receiving edits to the note via the note in the e-book presentation pane 2310.

The method can also involve receiving selection of a note/glyph in an e-book presentation pane 2312, jumping to the selected note object in the note-view pane 2314, and receiving edits to the note via the note portion of the note object in the note-view pane 2316.

E-books can be displayed in multiple formats including, for example, portrait, landscape, one-page view, one-page view with left and right margins, two-page view, two-page view with the left-hand page having a left margin and the right-hand page having a right margin, etc. One-page view involves the presentation of one display page of primary content in the presentation pane of an e-book interface while two-page view involves the presentation of two display pages of primary content side-by-side in the presentation pane of an e-book interface.

Additionally, e-books interfaces can be re-sized and the e-book application can re-format the e-book interface based on a new size of the e-book interface. This is especially useful when displaying e-books on a large display having a lot of desktop space.

Figure 27:
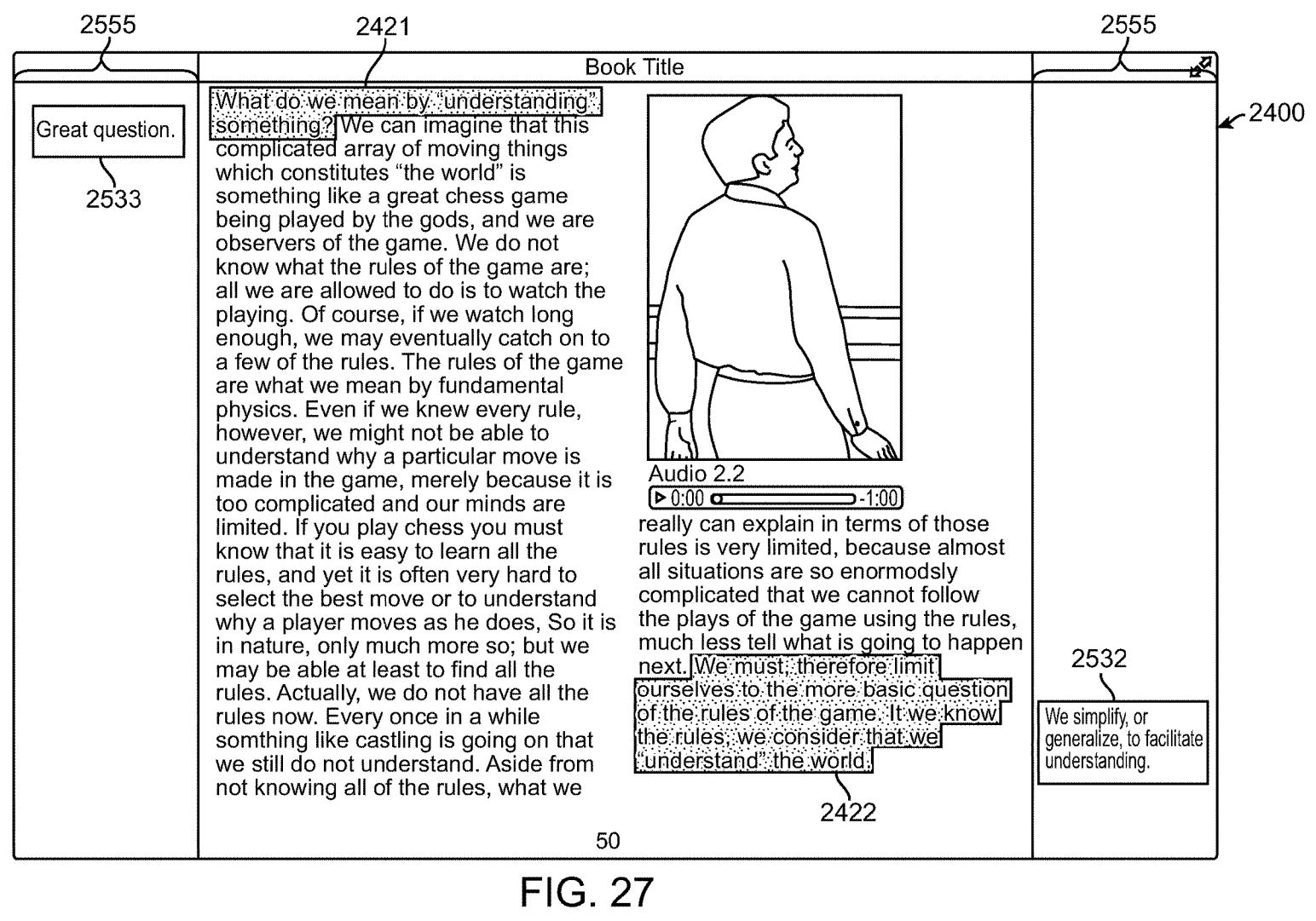
Figure 28:
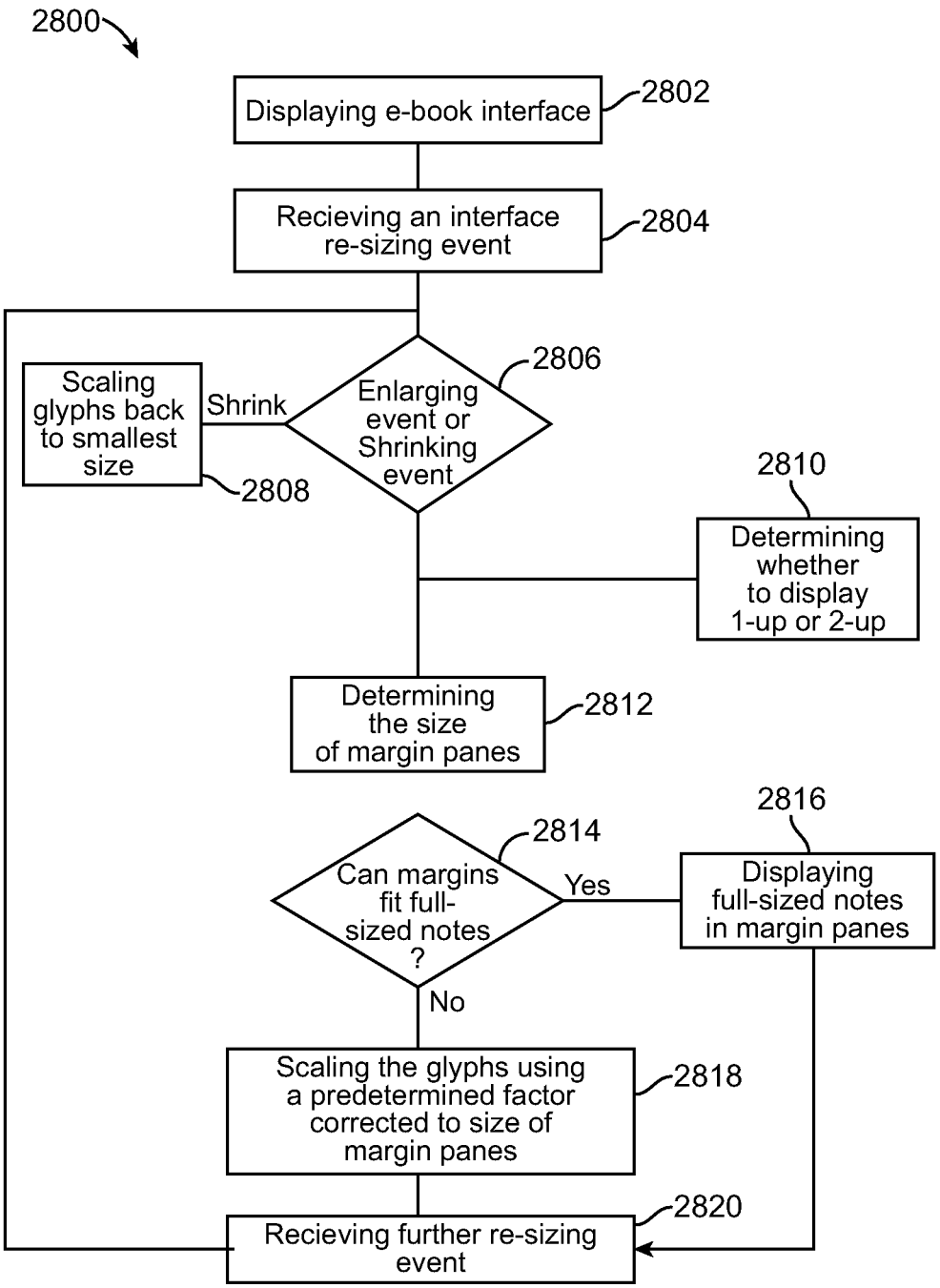
FIG. 28 illustrates an exemplary method of displaying primary e-book content, note glyphs and margins and of animating peeking pages and glyphs during and after re-sizing events according to some embodiments of the present technology.

In some embodiments of the present technology, an e-book application employs re-sizing animations that can make a user's experience with the e-book interface more intuitive and more enjoyable. FIGS. 24-27 and 29-30 illustrate interfaces for displaying primary e-book content, note glyphs and margins and for animating peeking pages and glyphs during and after re-sizing events according to some embodiments of the present technology. Likewise, FIG. 28 illustrates a method of displaying primary e-book content, note glyphs and margins and of animating peeking pages and glyphs during and after re-sizing events according to some embodiments of the present technology.

Figure 24:
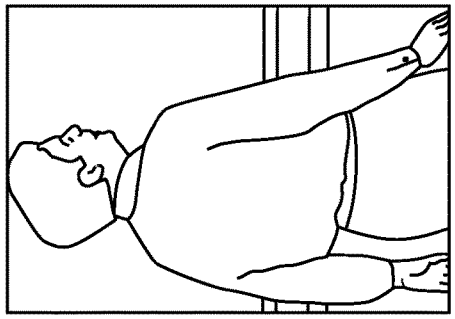

FIG. 24 illustrates an e-book interface 2400 having a one-page portrait orientation and including a presentation pane 2410 and no margin panes. The e-book interface 2400 contains two portions of highlighted text 2421, 2422. The first portion of highlighted text 2421 corresponds to a note-editing window 2431 that allows a reader to enter notes that will become linked to the first portion of highlighted text 2421. The second portion of highlighted text 2422 corresponds to a glyph 2432 that indicates that reader has already linked a note to the second portion of highlighted text 2422.

Figure 25:
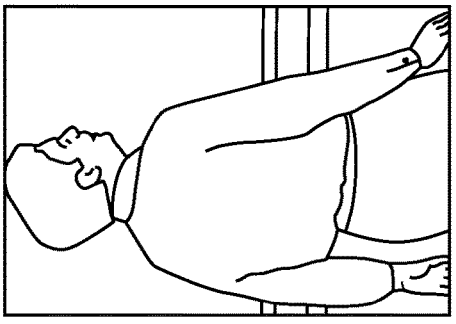

Upon a reader selecting an area of the e-book interface 2400 or another portion of the screen outside of the note-editing window 2431, the note-editing window 2431 fades out and becomes a glyph 2433, as shown in FIG. 25.

As explained above, the e-book interface 2400 shown in FIGS. 24 and 25 include no margin panes; however, as the e-book interface 2400 is re-sized, margin panes can begin to grow out from the presentation pane 2410.

Figure 26:
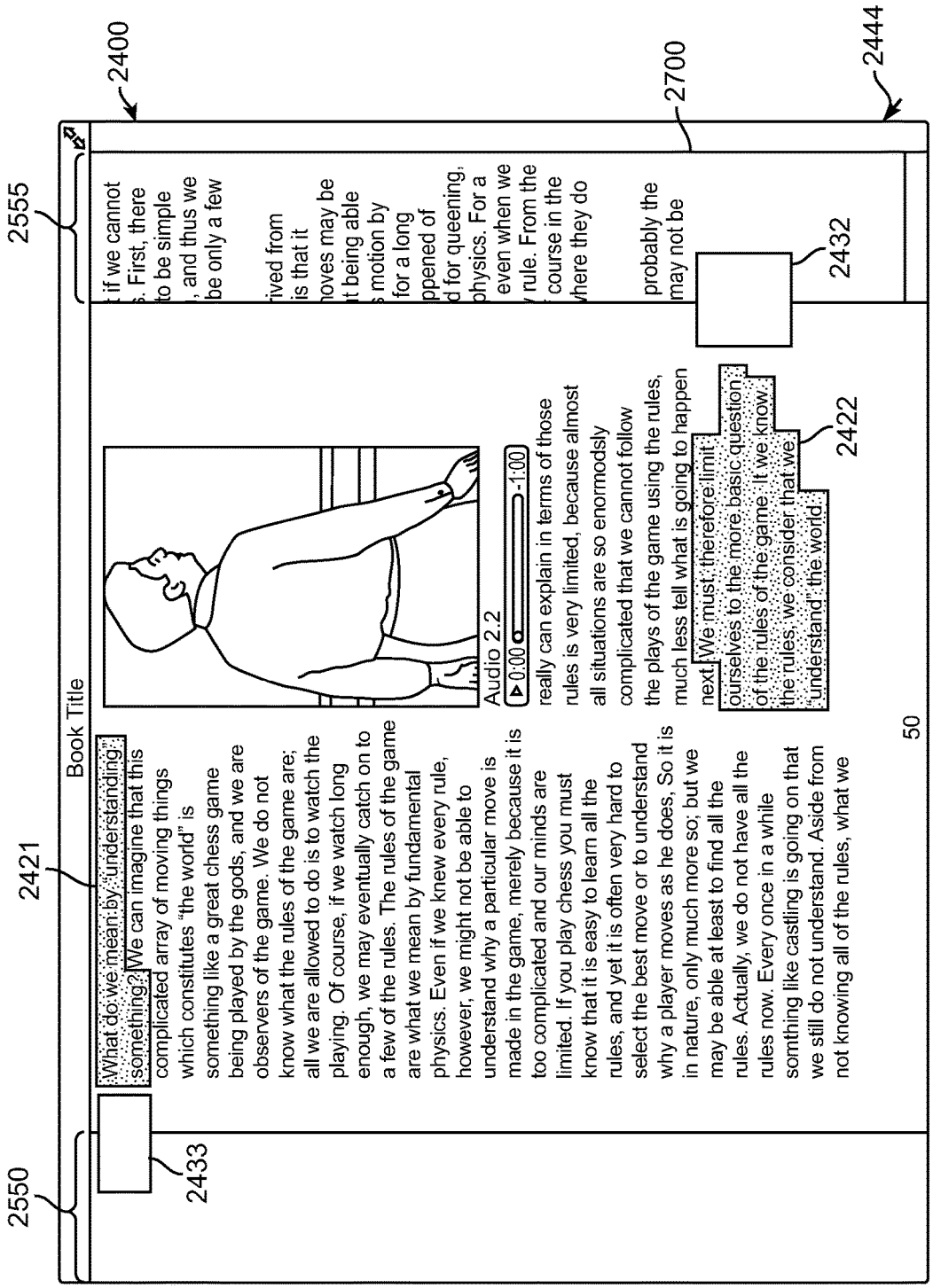

FIG. 26 illustrates the e-book interface 2400 as a reader begins to expand its size using a selection cursor 2499. As shown, left- and right-hand margin panes 2550, 2455 begin to grow from the sides of the presentation pane 2410. Similarly, the glyphs 2432, 2433 scale according to a scaling factor correlated to the size of the margins panes 2550, 2455. For example, the glyphs 2432, 2433 can scale to a size of fifty percent the size of the margins.

In some embodiments, while unscaled glyphs 2432, 2433 are displayed in the presentation pane 2410 only, the scaled glyphs 2432, 2433 can be displayed in an orientation that overlaps the presentation pane 2410 and the margin panes 2550, 2455. Also, in some embodiments, the scaled glyphs 2432, 2433 can be displayed on the left-hand side or the right-hand side of a one-page e-book interface according to the direction in which the reader highlighted the highlighted text 2421, 2432.

Additionally, during the enlargement of the e-book interface 2400, the e-book interface 2400 can display a "peeking page" 2700 which is a small image representing the content on an immediately subsequent page of the e-book. If the re-sizing event does not terminate with an e-book interface having a large enough size to present a two-page format, the e-book application can further animate the peeking page 2700 to "slide" back "beneath" the current page of primary content in the presentation pane of the e-book interface 2400. Alternatively, if the re-sizing event results in an e-book interface having a large enough size to present a two-page format, the e-book application can animate the peeking page 2700 to smoothly transition to fill the second display slot of the two-page format with the subsequent page of the e-book previously represented by the peeking page, as shown in FIGS. 29 and 30 below.

Referring again to FIG. 27, upon continued enlargement of the e-book interface 2400, the scaled glyphs 2432, 2433 continue to scale with the size of the margin panes 2550, 2555, until the margin panes 2550, 2555 grow to a size that can fit "full-sized" notes of a predetermined size. At this point the scaled glyphs 2432, 2433 transition to "full-sized" notes 2532, 2533 that appear in the margin panes 2550, 2555 and that contain the text added by the reader, as shown in FIG. 27.

In some embodiments, interface enlarging events cause glyphs to scale up at a predetermined scaling factor and interface shrinking events cause the glyphs to scale down by the same factor. However, in some embodiments, interface-shrinking events can cause the glyphs to more quickly scale down or to immediately revert back to their smallest size displayed as an overlay in the presentation pane.

FIG. 28 illustrates a method 2800 of scaling glyphs according to some embodiments of the present technology. First, the method 2800 involves displaying an e-book interface 2802 that includes a presentation pane and can additionally include margin panes. Next, the method 2800 involves receiving an interface re-sizing event 2804 and determining whether the event is an enlarging event or a shrinking event 2806. The re-sizing event can be a manual re-sizing event or an automatic re-sizing event, e.g. after a reader clicks a "full screen" menu option.

If the re-sizing event is a shrinking event, the e-book application can shrink the glyphs back to their smallest size in the presentation pane 2808, as described above. Alternatively, if the re-sizing event is an enlarging event, the method 2800 further involves determining whether the e-book interface is now large enough to display a two-page format 2810.

Next, the method 2800 involves measuring the size of the margin panes 2812 and determining whether the margins can fit full-sized notes with text having a predetermined size 2814. If so, the e-book application displays full-sized notes in the presentation pane 2816. In some embodiments, a separate animation involves fading the scaled glyphs out and fading the full-sized notes in. If the margin panes cannot accommodate full-sized notes, the method 2800 involves scaling the glyphs using a predetermined scaling factor correlated to the size of the margins 2818.

Additionally, the method 2800 can iterate upon receiving further resizing events 2820.

Figure 31A:
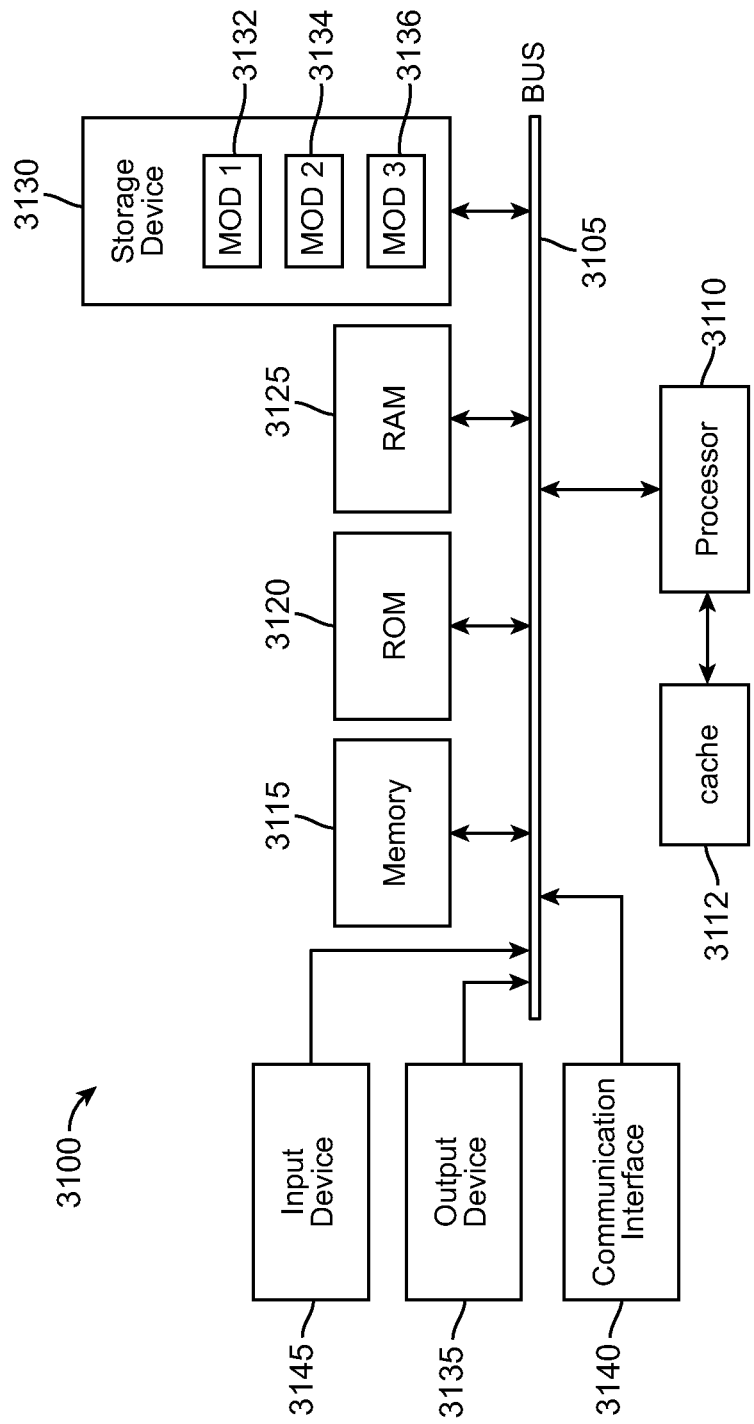
FIG. 31A and FIG. 31B illustrate exemplary possible system embodiments.
Figure 31B:
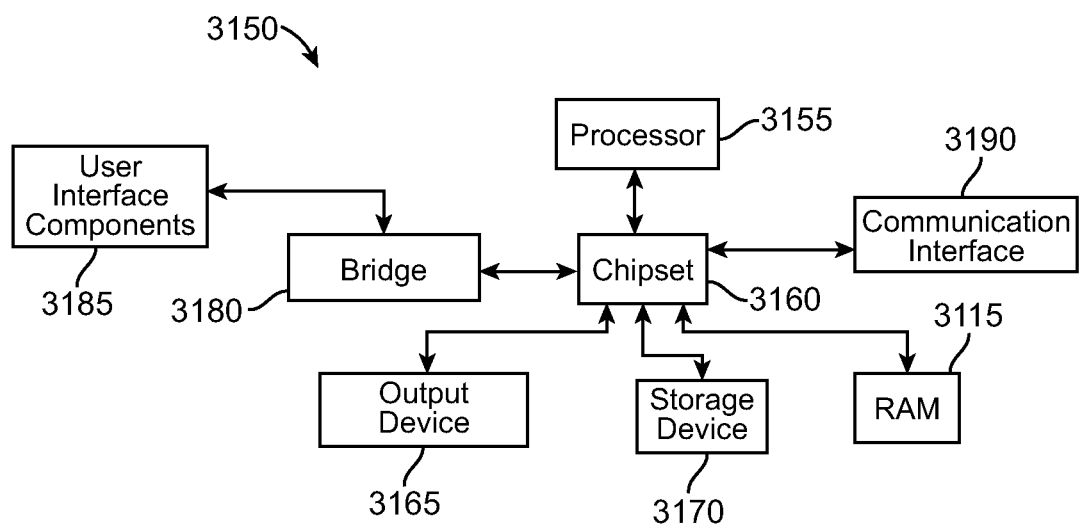

FIGS. 29 and 30 illustrate the e-book interface 2400 after being resized large enough to accommodate a two-page format according to some embodiments of the present technology. According to FIG. 29, while the e-book interface 2400 is large enough to accommodate two displays of primary content 2481, 2482, the e-book interface 2400 is not large enough to display margins as well. Accordingly, the glyphs 2433, 2432 and glyphs 2434, 2435 that are linked to highlighted text 2424, 2425 are scaled back down and presented as an overlay on the presentation panes that display the primary content 2481, 2482. FIG. 30 illustrates the e-book interface 2400 re-sized large enough to accommodate two displays of primary content 2481, 2482 and margins 2550, 2555 as well. In fact, according to FIG. 30, the margins 2550, 2555 are large enough to fit full-sized notes. Accordingly, the glyphs 2433, 2432, 2434, 2435 are scaled to full-sized notes and displayed completely in the margins 2550, 2555 and populated with text FIG. 31A and FIG. 31B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 31A illustrates a conventional system bus computing system architecture 3100 wherein the components of the system are in electrical communication with each other using a bus 3105. Exemplary system 3100 includes a processing unit (CPU or processor) 3110 and a system bus 3105 that couples various system components including the system memory 3115, such as read only memory (ROM) 3120 and random access memory (RAM) 3125, to the processor 3110. The system 3100 can include a cache of high-speed memory connected directly with, in close proximity to, or integrated as part of the processor 3110. The system 3100 can copy data from the memory 3115 and/or the storage device 3130 to the cache 3112 for quick access by the processor 3110. In this way, the cache can provide a performance boost that avoids processor 3110 delays while waiting for data. These and other modules can control or be configured to control the processor 3110 to perform various actions. Other system memory 3115 may be available for use as well. The memory 3115 can include multiple different types of memory with different performance characteristics. The processor 3110 can include any general purpose processor and a hardware module or software module, such as module 1 3132, module 2 3134, and module 3 3136 stored in storage device 3130, configured to control the processor 3110 as well as a special-purpose processor where software instructions are incorporated into the actual processor design. The processor 3110 may essentially be a completely self-contained computing system, containing multiple cores or processors, a bus, memory controller, cache, etc. A multi-core processor may be symmetric or asymmetric.

To enable user interaction with the computing device 3100, an input device 3145 can represent any number of input mechanisms, such as a microphone for speech, a touch-sensitive screen for gesture or graphical input, keyboard, mouse, motion input, speech and so forth. An output device 3135 can also be one or more of a number of output mechanisms known to those of skill in the art. In some instances, multimodal systems can enable a user to provide multiple types of input to communicate with the computing device 3100. The communications interface 3140 can generally govern and manage the user input and system output. There is no restriction on operating on any particular hardware arrangement and therefore the basic features here may easily be substituted for improved hardware or firmware arrangements as they are developed.

Storage device 3130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 3125, read only memory (ROM) 3120, and hybrids thereof.

The storage device 3130 can include software modules 3132, 3134, 3136 for controlling the processor 3110. Other hardware or software modules are contemplated. The storage device 3130 can be connected to the system bus 3105. In one aspect, a hardware module that performs a particular function can include the software component stored in a computer-readable medium in connection with the necessary hardware components, such as the processor 3110, bus 3105, display 3135, and so forth, to carry out the function.

FIG. 31B illustrates a computer system 3150 having a chipset architecture that can be used in executing the described method and generating and displaying a graphical user interface (GUI). Computer system 3150 is an example of computer hardware, software, and firmware that can be used to implement the disclosed technology. System 3150 can include a processor 3155, representative of any number of physically and/or logically distinct resources capable of executing software, firmware, and hardware configured to perform identified computations. Processor 3155 can communicate with a chipset 3160 that can control input to and output from processor 3155. In this example, chipset 3160 outputs information to output 3165, such as a display, and can read and write information to storage device 3170, which can include magnetic media, and solid state media, for example. Chipset 3160 can also read data from and write data to RAM 3175. A bridge 3180 for interfacing with a variety of user interface components 3185 can be provided for interfacing with chipset 3160. Such user interface components 3185 can include a keyboard, a microphone, touch detection and processing circuitry, a pointing device, such as a mouse, and so on. In general, inputs to system 3150 can come from any of a variety of sources, machine generated and/or human generated.

Chipset 3160 can also interface with one or more communication interfaces 3190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 3155 analyzing data stored in storage 3170 or 3175. Further, the machine can receive inputs from a user via user interface components 3185 and execute appropriate functions, such as browsing functions by interpreting these inputs using processor 3155.

It can be appreciated that exemplary systems 3100 and 3150 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A computing-device-implemented method for navigating media displayed in a media interface of a computing device, comprising:
    displaying, in the media interface of the computing device, a presentation pane configured to display primary content and a pair of vertical margin panes configured to display secondary content that is linked to the primary content, wherein the pair of vertical margin panes are adjacent to the presentation pane;
    receiving, by the computing device, a media interface re-sizing event;
    dynamically measuring a size of the vertical margin panes of the media interface after receiving the re-sizing event;
    scaling a glyph displayed in one of the vertical margin panes in accordance with the dynamically measured size of the vertical margin panes; and
    animating the glyph by transforming the glyph into a note when the glyph has been scaled to a determined size, wherein the note is displayed with at least some of the secondary content.

2. The computing-device-implemented method of claim 1, further comprising:
    determining how many displays of primary content can be displayed within the presentation pane based on a determination of how many full views of primary content fit within the resized media interface, wherein each presentation pane displays only one full view of primary content; and
    displaying a number of presentation panes determined to fit within the media interface, wherein the pair of vertical margins panes is displayed in any remaining space within the media interface.

3. The computing-device-implemented method of claim 1, wherein the glyph is scaled according to a scaling factor correlated to the size of the vertical margin panes.

4. The computing-device-implemented method of claim 3, wherein the determined size is based on a size of the secondary content.

5. The computing-device-implemented method of claim 3, wherein the glyph located in one of the vertical margin panes is a first glyph located in a left margin pane of the pair of vertical margin panes, wherein a second glyph is located in a right margin pane of the pair of vertical margin panes, and wherein the method further comprises:
    scaling the second glyph displayed in the right margin pane in accordance with the dynamically measured size of the vertical margin panes; and
    animating the second glyph by transforming the second glyph into a second note when the second glyph has been scaled to a determined size, wherein the second note is displayed with at least some of the secondary content.

6. The computing-device-implemented method of claim 1, further comprising:
    upon continued re-sizing of the media interface, determining that a total width of the media interface is large enough to display two primary content displays in the presentation pane;
    displaying an additional primary content display in the presentation pane in the media interface, wherein the vertical margin panes are reduced or removed to accommodate the additional primary content display;
    fading out the display of the note; and
    re-displaying the glyph in the presentation pane.

7. The computing-device-implemented method of claim 6, further comprising:
    upon continued re-sizing of the media interface, scaling the glyph in accordance with the dynamically measured size of the vertical margin panes, wherein the glyph is scaled according to a scaling factor correlated to the size of the vertical margin panes.

8. An electronic device for navigating media displayed in a media interface of the electronic device comprising:
    a processor; and
    an e-book application module configured to:
        display, in the media interface of the electronic device, a presentation pane configured to display primary content and a pair of vertical margin panes configured to display secondary content that is linked to the primary content, wherein the pair of vertical margin panes are adjacent to the presentation pane;
        receive a media interface re-sizing event;
        dynamically measure a size of the vertical margin panes of the media interface after receiving the re-sizing event;
        scale a glyph displayed in one of the vertical margin panes in accordance with the dynamically measured size of the vertical margin panes; and
        animate the glyph by transforming the glyph into a note when the glyph has been scaled to a determined size, wherein the note is displayed with at least some of the secondary content.

9. The electronic device of claim 8, wherein the e-book application module is further configured to:
    determine how many displays of primary content can be displayed within the presentation pane based on a determination of how many full views of primary content fit within the resized media interface, wherein each presentation pane displays only one full view of primary content; and
    display a number of presentation panes determined to fit within the media interface, wherein the pair of vertical margin panes is displayed in any remaining space within the media interface.

10. The electronic device of claim 8, wherein the glyph is scaled according to a scaling factor correlated to the size of the vertical margin panes.

11. The electronic device of claim 10, wherein the determined size is based on a size of the secondary content.

12. The electronic device of claim 10, wherein the glyph located in one of the vertical margin panes is a first glyph located in a left margin pane of the pair of vertical margin panes, wherein a second glyph is located in a right margin pane of the pair of vertical margin panes, and wherein the e-book application module is further configured to:
- scale the second glyph displayed in the right margin pane in accordance with the dynamically measured size of the vertical margin panes;
- animate the second glyph by transforming the second glyph into a second note when the second glyph has been scaled to a determined size, wherein the second note is displayed with at least some of the secondary content.

13. The electronic device of claim 8, wherein the e-book application module is further configured to:
- upon continued re-sizing of the media interface, determine that a total width of the media interface is large enough to display two primary content displays in the presentation pane;
- display an additional primary content display in the presentation pane in the media interface, wherein the vertical margin panes are reduced or removed to accommodate the additional primary content display;
- fade out the display of the note; and
- re-display the glyph in the presentation pane.

14. The electronic device of claim 13, wherein the e-book application module is further configured to:
- upon continued re-sizing of the media interface, scale the glyph in accordance with the dynamically measured size of the vertical margin panes, wherein the glyph is scaled according to a scaling factor correlated to the size of the vertical margin panes.

15. A non-transitory computer-readable storage medium comprising:
- a medium configured to store computer-readable instructions for navigating media displayed in a media interface thereon; and
- the computer-readable instructions which, when executed by a processing device cause the processing device to:
  - display, in a media interface, a presentation pane configured to display primary content and a pair of vertical margin panes configured to display secondary content that is linked to the primary content, wherein the pair of vertical margin panes are adjacent to the presentation pane;
  - receive, by the processing device, a media interface re-sizing event;
  - dynamically measure a size of the vertical margin panes of the media interface after receiving the re-sizing event;
  - scale a glyph displayed in one of the vertical margin panes in accordance with the dynamically measured size of the vertical margin panes; and
  - animate the glyph by transforming the glyph into a note when the glyph has been scaled to a determined size, wherein the note is displayed with at least some of the secondary content.

16. The non-transitory computer-readable storage medium of claim 15, wherein the instructions further cause the processing device to:
- determine how many displays of primary content can be displayed within the presentation pane based on a determination of how many full views of primary content fit within the resized media interface, wherein each presentation pane displays only one full view of primary content; and
- display a number of presentation panes determined to fit within the media interface, wherein the pair of vertical margin panes is displayed in any remaining space within the media interface.

17. The non-transitory computer-readable storage medium of claim 15, wherein the glyph is scaled according to a scaling factor correlated to the size of the vertical margin panes.

18. The non-transitory computer-readable storage medium of claim 16, wherein the determined size is based on a size of the secondary content.

19. The non-transitory computer-readable storage medium of claim 16, wherein the glyph located in one of the vertical margin panes is a first glyph located in a left margin pane of the pair of vertical margin panes, wherein a second glyph is located in a right margin pane of the pair of vertical margin panes, and wherein the instructions further cause the processing device to:
- scale the second glyph displayed in the right margin pane in accordance with the dynamically measured size of the vertical margin panes; and
- animate the second glyph by transforming the second glyph into a second note when the second glyph has been scaled to a determined size, wherein the second note is displayed with at least some of the secondary content.

20. The non-transitory computer-readable storage medium of claim 15, wherein the instructions further cause the processing device to:
- upon continued re-sizing of the media interface, determine that a total width of the media interface is large enough to display two primary content displays in the presentation pane;
- display an additional primary content display in the presentation pane in the media interface, wherein the vertical margin panes are reduced or removed to accommodate the additional primary content display;
- fade out the display of the note; and
- re-display the glyph in the presentation pane.

21. The non-transitory computer-readable storage medium of claim 20, wherein the instructions further cause the processing device to:
- upon continued re-sizing of the media interface, scale the glyph in accordance with the dynamically measured size of the vertical margin panes, wherein the glyph is scaled according to a scaling factor correlated to the size of the vertical margin panes.

* * * * *